United States Patent
Wells et al.

(10) Patent No.: US 8,932,465 B2
(45) Date of Patent: *Jan. 13, 2015

(54) FILTER CARTRIDGE HAVING A FILTER WITHIN A FILTER, AND AN ENDPLATE SEALING STRUCTURE ON AN OUTER FILTER ELEMENT

(71) Applicant: Cummins Filtration IP, Inc., Minneapolis, MN (US)

(72) Inventors: Aaron M. Wells, Cookeville, TN (US); Terry W. Shults, Cookeville, TN (US); Ismail C. Bagci, Cookeville, TN (US); Dean Olson, Cookeville, TN (US); Zemin Jiang, Cookeville, TN (US); Kevin C. South, Cookeville, TN (US); Peter K. Herman, Stoughton, WI (US); Hendrik N. Amirkhanian, Cookeville, TN (US); Jeffrey B. Sharp, Cookeville, TN (US); David P. Genter, Columbus, IN (US); Norman C. Blizard, Columbus, IN (US); Melvin Douglas McCormick, Cookeville, TN (US); Jeffrey A. Husband, Cookeville, TN (US); Wassem Abdalla, Quimper (FR); Michael J. Connor, Stoughton, WI (US); Barry M. Verdegan, Stoughton, WI (US); Donna Butler, Cookeville, TN (US); Chad T. Brummitt, Algood, TN (US)

(73) Assignee: Cummins Filtration IP Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,988

(22) Filed: Nov. 27, 2012

(65) Prior Publication Data

US 2013/0087497 A1 Apr. 11, 2013

Related U.S. Application Data

(63) Continuation of application No. 12/606,729, filed on Oct. 27, 2009, now Pat. No. 8,333,890.

(60) Provisional application No. 61/108,762, filed on Oct. 27, 2008.

(51) Int. Cl.
  *B01D 35/30* (2006.01)
  *B01D 27/14* (2006.01)
  (Continued)

(52) U.S. Cl.
  CPC ............ *B01D 29/58* (2013.01); *B01D 29/21* (2013.01); *B01D 36/005* (2013.01); *B01D 36/006* (2013.01); *B01D 2201/295* (2013.01); *B01D 2201/34* (2013.01)
  USPC ........... 210/338; 210/232; 210/314; 210/315; 210/335; 210/337; 210/342; 210/455; 210/450; 210/487

(58) Field of Classification Search
  None
  See application file for complete search history.

(56) References Cited

U.S. PATENT DOCUMENTS 2,864,505 A 12/1958 Kasten
2,962,121 A 11/1960 Wilber
(Continued)

OTHER PUBLICATIONS

International Search Report for International Application PCT/US2009/062196, dated Jun. 11, 2010 (3 pages).
(Continued)

*Primary Examiner* — Benjamin Kurtz
(74) *Attorney, Agent, or Firm* — Foley & Lardner LLP

(57) ABSTRACT

A filter within a filter cartridge design is described that includes a sealing structure on an endplate of an outer filter element. Generally, the sealing structure includes an annular flange on the endplate that can directly seal against an interior surface of a housing when the filter cartridge is assembled for use. During filtration, the annular flange prevents a working fluid from bypassing the outer filter element. The sealing flange can seal with the housing in a press fit engagement.

21 Claims, 22 Drawing Sheets

(51) Int. Cl.
  *B01D 29/58* (2006.01)
  *B01D 29/21* (2006.01)
  *B01D 36/00* (2006.01)

(56) References Cited

U.S. PATENT DOCUMENTS

| | | |
|---|---|---|
| 3,187,895 A | 6/1965 | Pall et al. |
| 4,253,954 A | 3/1981 | Midkiff et al. |
| 4,372,847 A * | 2/1983 | Lewis .............. 210/86 |
| 5,342,511 A | 8/1994 | Brown et al. |
| 5,556,542 A | 9/1996 | Berman et al. |
| 6,626,299 B1 | 9/2003 | Brown et al. |
| 6,793,615 B2 | 9/2004 | South et al. |
| 7,279,091 B2 | 10/2007 | Sann et al. |
| 8,333,890 B2 * | 12/2012 | Wells et al. ............ 210/335 |
| 2002/0157999 A1 | 10/2002 | Baracchi et al. |
| 2004/0074827 A1 | 4/2004 | Sann et al. |
| 2005/0167351 A1 | 8/2005 | Herman et al. |
| 2007/0095744 A1 | 5/2007 | Bagci et al. |
| 2007/0289915 A1 | 12/2007 | Jiang et al. |
| 2009/0020465 A1 | 1/2009 | Jiang et al. |
| 2009/0071892 A1 | 3/2009 | Malgorn |
| 2009/0250402 A1 | 10/2009 | Jiang et al. |

OTHER PUBLICATIONS

Written Opinion of the International Searching Authority for International Application PCT/US2009/062196, dated Jun. 11, 2010 (4 pages).

* cited by examiner

FILTER CARTRIDGE HAVING A FILTER WITHIN A FILTER, AND AN ENDPLATE SEALING STRUCTURE ON AN OUTER FILTER ELEMENT This application claims the benefit of U.S. Provisional Application Ser. No. 61/108,762, filed on Oct. 27, 2008, and titled "FILTER CARTRIDGE HAVING A FILTER WITHIN A FILTER, AND AN ENDPLATE SEALING STRUCTURE ON AN OUTER FILTER ELEMENT", the entirety of which is incorporated herewith by reference.

FIELD

The disclosure herein generally relates to fluid filters and their assemblies. More particularly, the present disclosure relates to a filter cartridge for a filter within a filter arrangement. An outer filter element of the cartridge has an improved seal configuration, where a working fluid must first flow through the outer filter element before reaching an inner filter element.

BACKGROUND

Fluid filters are widely known and used in various filtration systems and applications, for instance where there is a need for particle and/or fluid separation from a working fluid in a protected system. As one example, fuel filtration systems for engines are well known and can employ fluid filters that are aimed at water and particle separation from fuel. Filter cartridges in some of these filters have one filter element with media to first coalesce water, and have another filter element that has media to further filter the fuel, while the coalesced water drains from the cartridge. In many cases, such media is arranged in a concentric filter within a filter configuration, where the outer filter element has the more coarse media to coalesce the water, and the inner filter element has the more fine media that can remove particulates from the fuel, while the coalesced water drains out of the cartridge.

However, current filter within a filter designs can encounter problems. Avoiding problems is desired to provide effective filtration, to provide water removal efficiency, and to protect engine components.

Improvements can be made upon existing filter designs. Particularly, structural improvements can be made as to how cartridges having the filter within a filter arrangement are sealed, so as to prevent a working fluid from bypassing the outer filter element of the cartridge before reaching an inner filter element of the cartridge.

SUMMARY

The present disclosure generally relates to a filter within a filter cartridge design that includes a unique sealing structure on an endplate of an outer filter element. Generally, the sealing structure includes an annular flange on the endplate that can seal against an interior surface of a housing when the filter cartridge is assembled for use. During filtration, the annular flange prevents a working fluid from bypassing the outer filter element.

In one embodiment, a filter cartridge includes outer and inner filter elements having respective filtering media. The media of the outer filter element is arranged around the media of the inner filter element, such that a space is defined therebetween. The media of the inner filter element defines a space therein that is separate from the space between the media. For example such a space can be in the range of 0.125" to 1" per side. The outer filter element has a first endplate connected at one end and a second endplate connected at an opposing end. The inner filter element has a first endplate connected at one end and a second endplate connected at an opposing end. The first endplate of the outer filter element and the first endplate of the inner filter element are connected in a fluid tight seal and define an outlet flow passage. This internal seal is needed to keep the unfiltered particles from by-passing the secondary filter. This design creates a cylindrical surface to surface contact between the two adjoining endplates but can also be accomplished through means of an elastomeric seal. The second endplate of the outer filter element and the second endplate of the inner filter element are connected and define a drain channel. The space between the media is in fluid communication with the drain channel and the space within the inner filter element is in fluid communication with the outlet flow passage. The second endplate of the outer filter element includes a sealing flange surrounding the drain channel.

In one embodiment, a filter housing includes an inner surface with a main filtration cavity and a reservoir cavity, defined by an inward protruding flange therebetween. The filter cartridge can be inserted into the main filtration cavity, such that the sealing flange seals against the inward protruding flange of the housing in a fluid tight seal to separate the filtration cavity from the reservoir cavity. In one embodiment, the sealing flange and the inward protruding flange are sealed in a press fit engagement.

In one embodiment, the filter housing and filter cartridge include connection and seal structures on their external surfaces that allow mating to existing filter heads.

DETAILED DESCRIPTION

Figure 1:
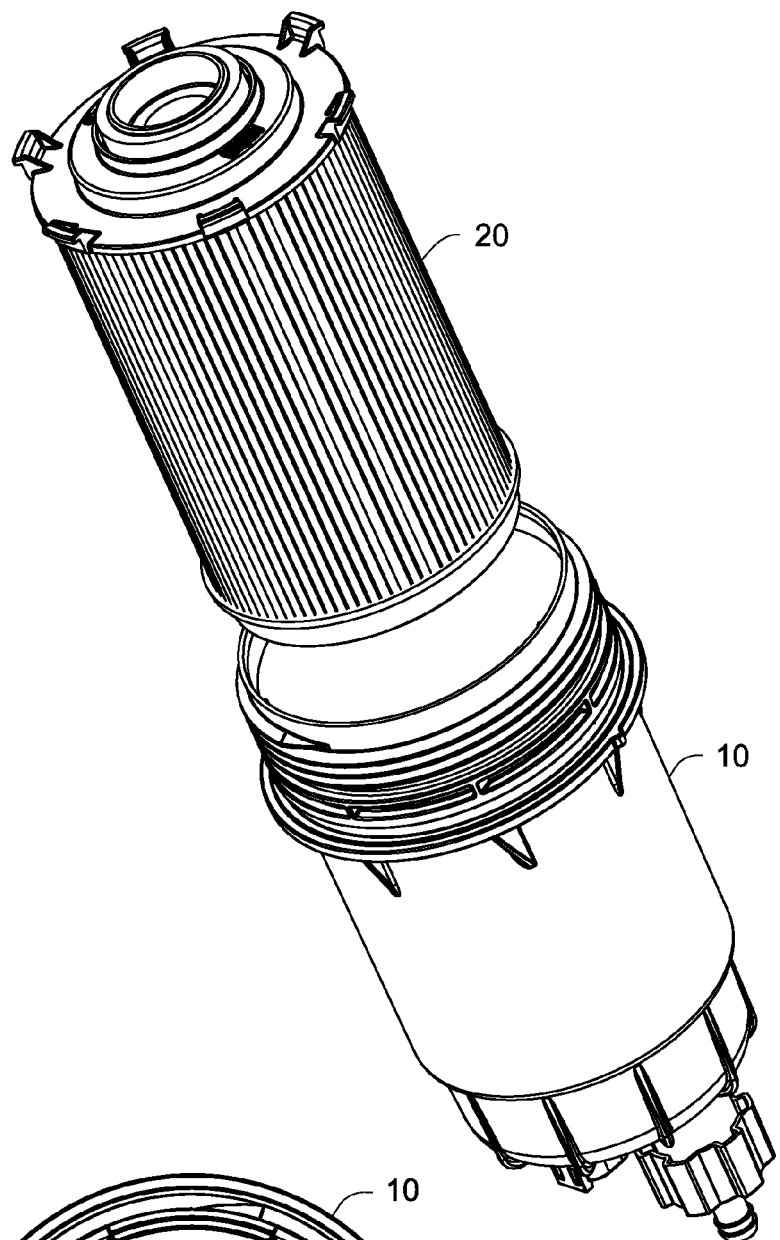
FIG. 1 is a perspective exploded view of one embodiment of an assembly of a filter cartridge and housing.
Figure 2:
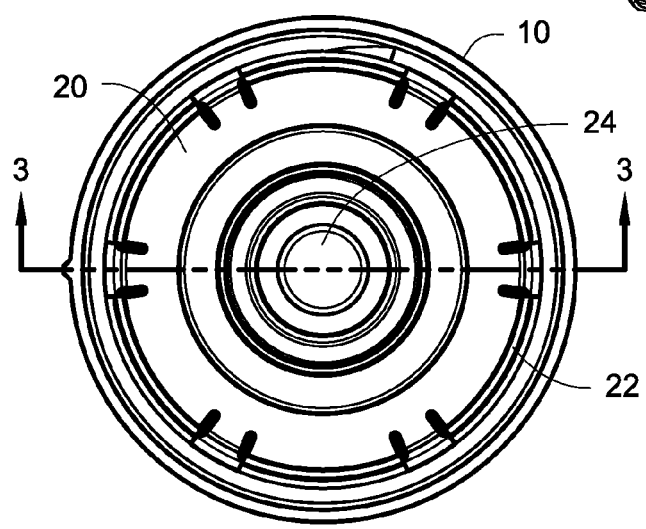
FIG. 2 is an end view of the filter cartridge and housing of FIG. 1.

FIGS. 1-31 of the present disclosure generally relate to a filter housing and filter cartridge assembly having a unique seal configuration, where an endplate of an outer filter element that seals directly to an inner surface of the housing. In multiple phase filtration, for example filter within a filter designs, the seal configuration and related structures described can prevent a working fluid from bypassing the outer filter element before it reaches an inner filter element. In engine systems, for example, the filter cartridge and housing structures described herein can provide effective filtration of a working fluid and protect engine components.

FIGS. 1-30 show one example of an assembly of a housing 10 and a filter cartridge 20. FIG. 31 shows the assembly connected to a filter head 120. In one embodiment, the assembly described can be employed as a fuel filter assembly, which is intended to filter a fluid, for example diesel fuel, and remove water from the fluid before the fluid reaches a protected system, for example a fuel injection pump and fuel injectors. Fuel filters and their uses are well known. For illustration purposes only, the inventive concepts for a filter cartridge and housing design are described with respect to a fuel filter assembly and with respect to filtration of fuel. However, it is to be realized that in appropriate circumstances the concepts described herein can be used for working fluids other than fuel. Likewise, in appropriate circumstances, the concepts described herein can be applied to other types of filter assemblies that filter other types of fluids, for example lubrication, hydraulic, and other liquids, as well as air.

FIGS. 1-4 illustrate one embodiment of the filter cartridge 20 assembled together with the housing 10. The housing 10 has a generally open end that the filter cartridge 20 can be inserted into. A water-in-fuel (WIF) sensor 100 and a drain valve 110 are connected at an opposite end of the housing 10. WIF sensors can generate a signal that is sent to an engine control unit (not shown), where the engine control unit can then generate a signal to indicate that the filter assembly needs to be changed, serviced, or drained. The drain valve 110 is closed during operation but can be opened when draining is desired. WIF sensors and drain valves are known and need no further description.

The assembly includes flow passages. An inlet 22 allows a working fluid to be filtered (e.g. fuel) to enter the assembly and an outlet 24 allows filtered fluid to exit the assembly. As shown, for example, the inlet 22 is a gap between an outer perimeter of the filter cartridge 20 and an inner perimeter of the housing 10 (best shown in FIG. 2). A working fluid can enter the inlet 22, flow through an outer filter element, flow through an inner filter element (inner and outer filter elements described in detail below), and exit the outlet 24 (see arrows of FIG. 3).

In one embodiment, the housing 10 and the filter cartridge 20 include outer connective and seal structures on their external surfaces that allow mating to filter head designs currently being used. As shown, for example, the housing 10 includes a threaded portion 12 and groove 14 for an o-ring or gasket seal and the filter cartridge 20 includes a gasket face seal 16. Such a configuration can be used to connect and seal the assembly to existing filter head designs, for example, fuel filter heads in other products of Cummins Filtration, Inc. (the Assignee of the present application), such as the MACH-2 fuel filter. See also e.g. the filter head 120 in FIG. 31.

Figure 3:
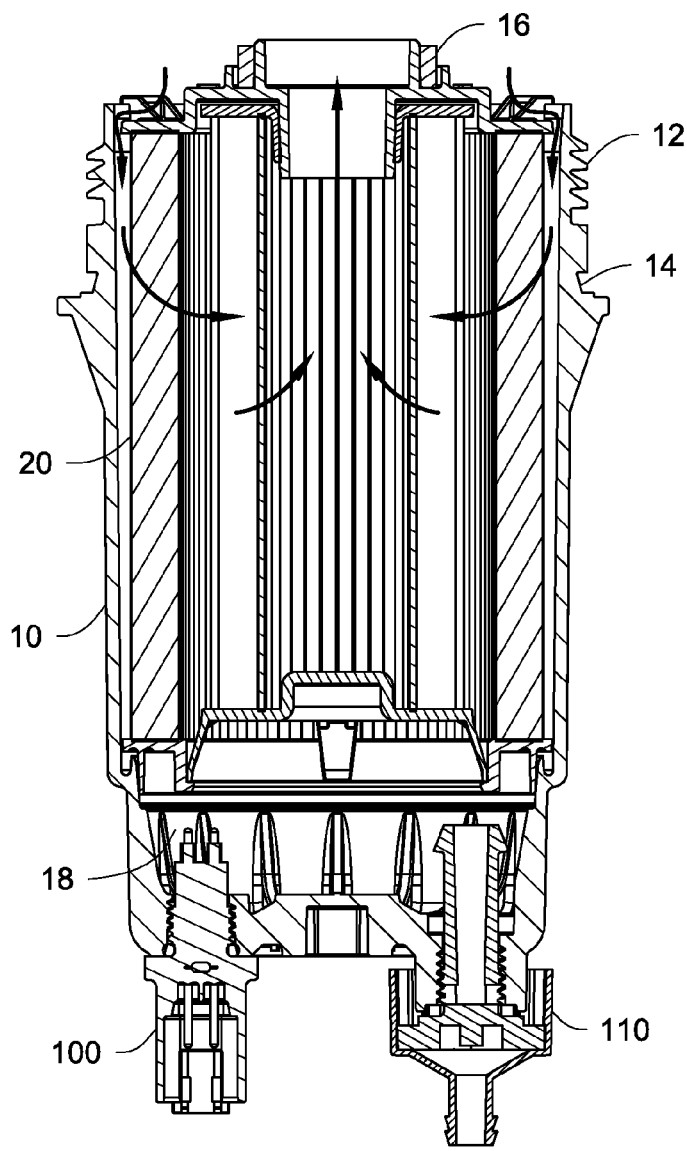
FIG. 3 is a side sectional view of the filter cartridge and housing of FIG. 1 taken from FIG. 2.
Figure 4:
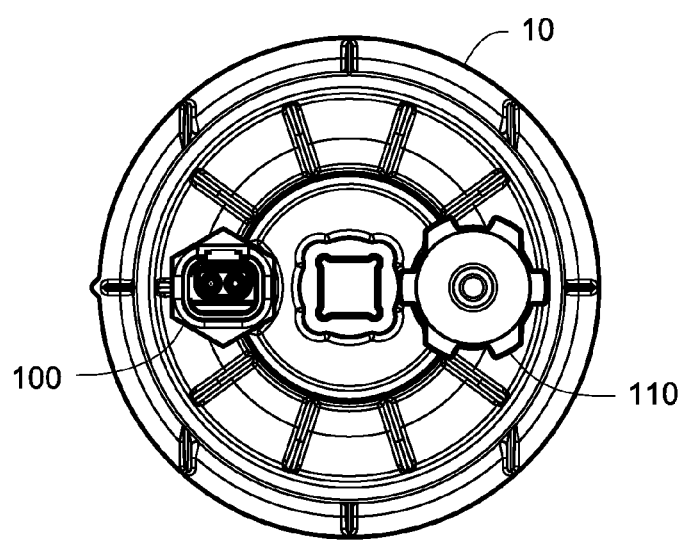
FIG. 4 is an opposite end view of the assembly of FIG. 1.

As shown in FIG. 3, the housing 10 includes a reservoir cavity 18 that is sealed from the general filtration cavity that the filter cartridge 20 resides in. In general, the filter cartridge includes an outer filter element with a sealing flange on an endplate that directly seals with an interior surface of the housing, which is described in detail below.

Figure 5:
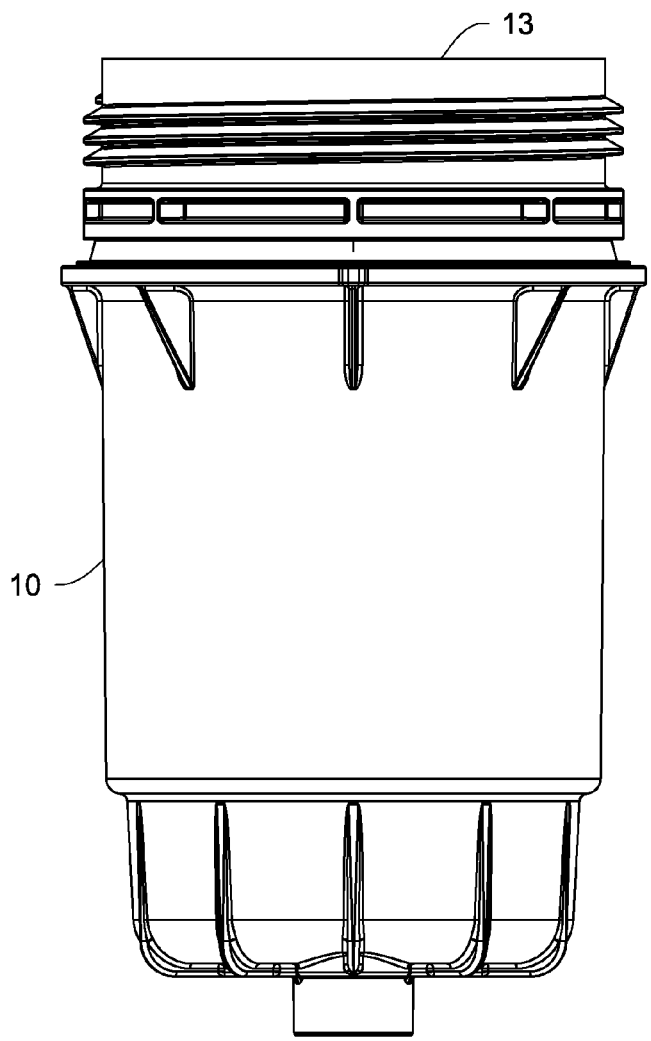
FIG. 5 is a side view of the housing of FIG. 1.
Figure 6:
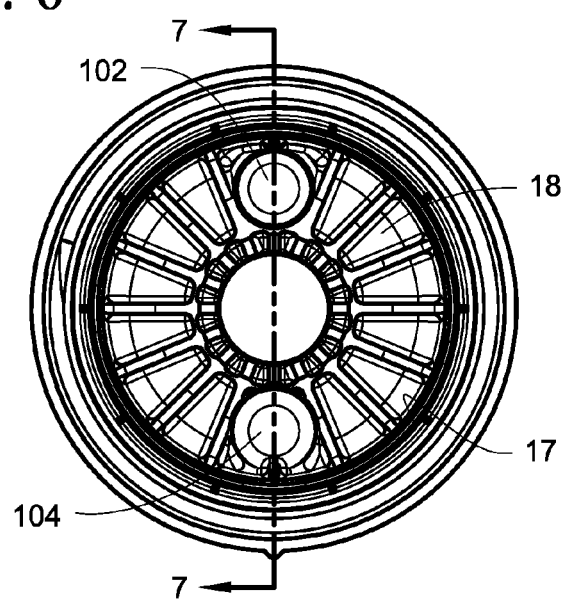
FIG. 6 is an end view of the housing of FIG. 1.
Figure 7:
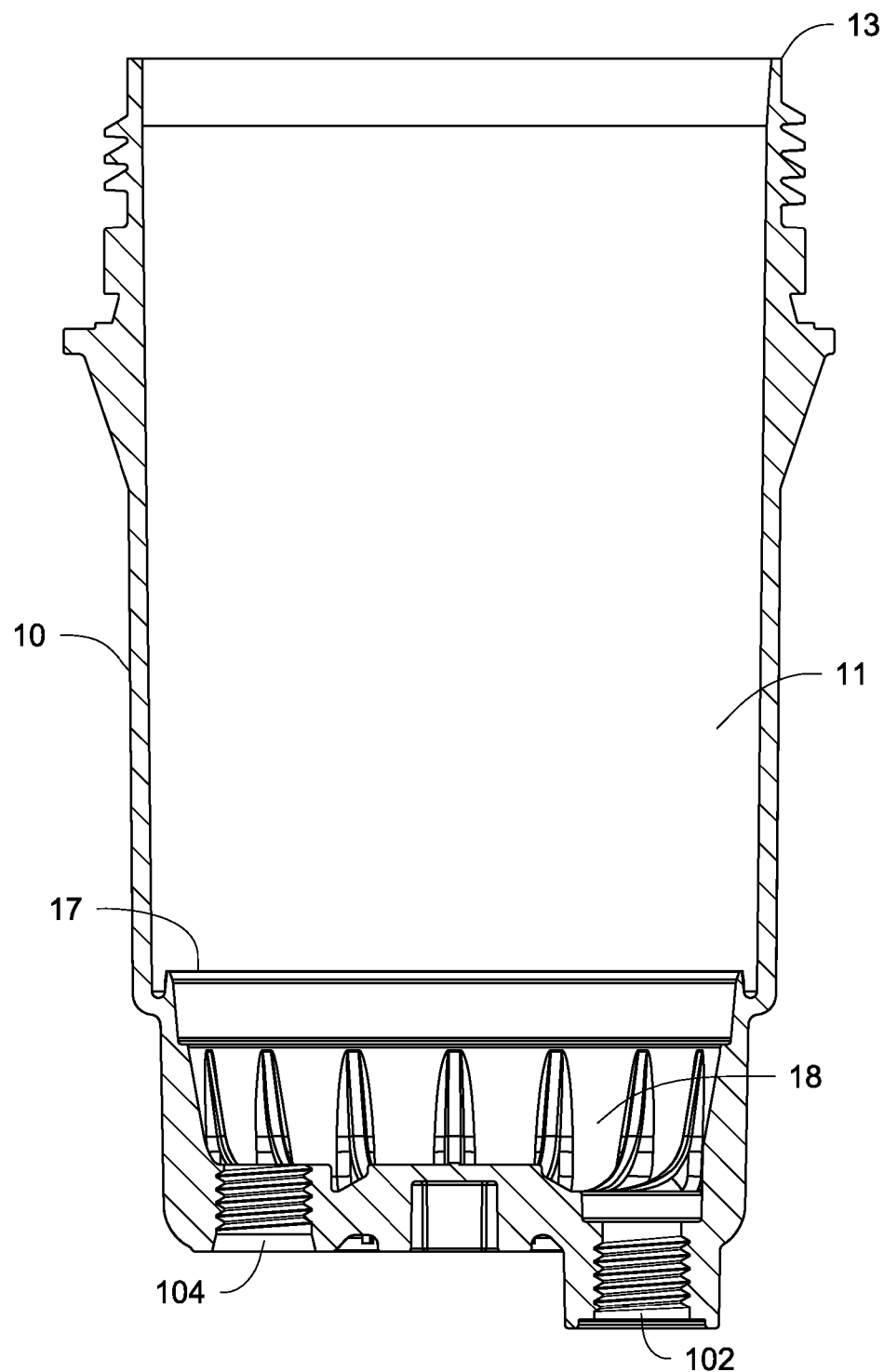
FIG. 7 is a side sectional view of the housing of FIG. 1 taken from FIG. 6.

With particular reference to the housing 10, FIGS. 5-7 show the housing 10 alone. The housing 10 includes an inner surface with a main filtration cavity 11 and the reservoir cavity 18, defined by an inward protruding flange 17 therebetween. The inward protruding flange 17 defines the separate cavities, where the reservoir cavity 18 can be a narrower portion than the main filtration cavity 11. In one embodiment, the protruding flange 17 is a U-shaped lip in section (best shown in FIG. 7) that is disposed about the inner surface of the housing 10. As shown and described, the filter cartridge 20 can be inserted into the main filtration cavity 11 and has a sealing flange that can be sealed against the inward protruding flange 17 of the housing 10 in a fluid tight seal (sealing flange further described below). The seal between the filter cartridge 20 and the protruding flange 17 separates the filtration cavity 11 from the reservoir cavity 18. The housing 10 further includes an end ridge 13 that can engage rests of the filter cartridge 20 (rests further described below).

Openings 102 and 104 respectively are in fluid communication with the reservoir cavity 18, and allow connection of the drain valve 110 and the WIF sensor 100, which can be connected by a threaded engagement.

Figure 8:
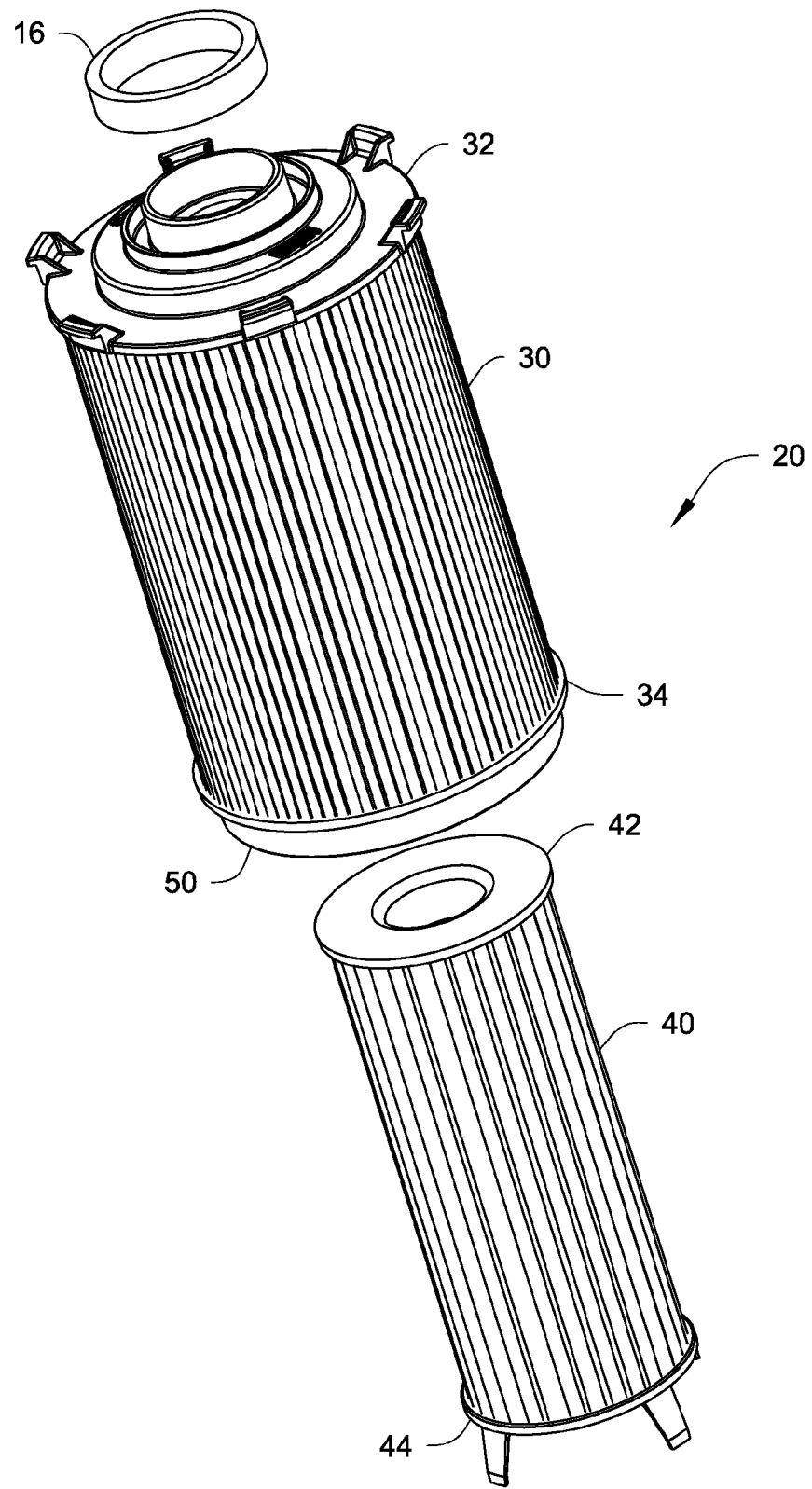
FIG. 8 is an exploded perspective view of the filter cartridge of FIG. 1 showing an outer filter element and an inner filter element.
Figure 9:
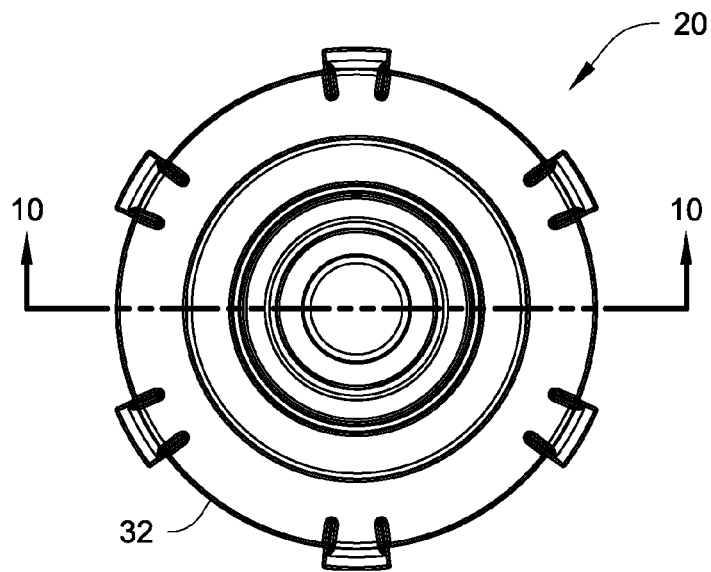
FIG. 9 is an end view of the filter cartridge of FIG. 1.
Figure 10:
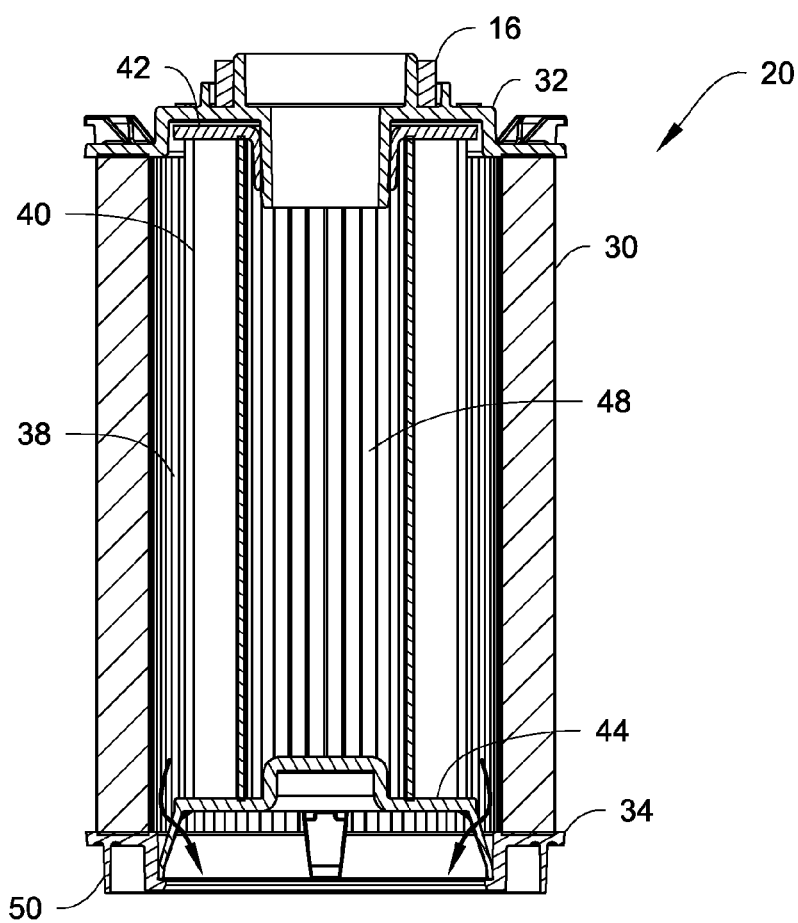
FIG. 10 is a side sectional view of the filter cartridge of FIG. 1 taken from FIG. 9.

With particular reference to the filter cartridge 20, FIGS. 8-10 show the filter cartridge 20 with an outer filter element 30 and an inner filter element 40.

In one embodiment, the outer and inner filter elements 30, 40 have respective filtering media 36, 46 (see FIGS. 13 and 22 respectively and described below). As one example, the media is a pleated material. Filtering media is well known, and filtering media in fuel filtration is well known and need not be further described. In some examples, the filtering media 36 of the outer filter element 30 is a coarser material (e.g. water coalescing) than the filtering media 46 of the inner filter element 40, which can employ a material more suited for fine filtration (e.g. particulate matter).

As shown in FIG. 10, for example, the media of the outer filter element 30 is arranged around the media of the inner filter element 40, such that a space 38 is defined therebetween. For example such a space (e.g. 38) can be in the range of 0.125" to 1" per side. The media of the inner filter element 40 defines a space 48 therein that is separate from the space 38 between the media. The outer filter element 30 has a first endplate 32 connected at one end and a second endplate 34 connected at an opposing end. The inner filter element 40 has a first endplate 42 connected at one end and a second endplate 44 connected at an opposing end. In some embodiments, the endplates 32, 34, 42, 44 of the outer and inner filter elements 30, 40 are embedded, bonded or otherwise fixed to the filter media 36, 46 to create fluid tight seals at the ends which they are connected.

The first endplate 32 of the outer filter element 30 and the first endplate 42 of the inner filter element 40 are connected in a fluid tight seal and define an outlet flow passage (e.g. outlet 24). The second endplate 34 of the outer filter element 30 and the second endplate 44 of the inner filter element 40 are connected and define a drain channel therethrough (see arrows of FIG. 10). The space 38 between the media is in fluid communication with the drain channel and the space 48 within the inner filter element 40 is in fluid communication with the outlet flow passage. In some examples, the respective endplates 32, 42 and 34, 44 can be connected through a press or interference fit.

The second endplate 34 of the outer filter element 40 includes one embodiment of a sealing flange 50 which surrounds the drain channel. As discussed above, the filter cartridge 20 can be inserted into the main filtration cavity 11 of the housing 10, such that the sealing flange (e.g. sealing flange 50) seals against the inward protruding flange 17 of the housing 10 in a fluid tight seal to separate the filtration cavity 11 from the reservoir cavity 18.

Figure 11:
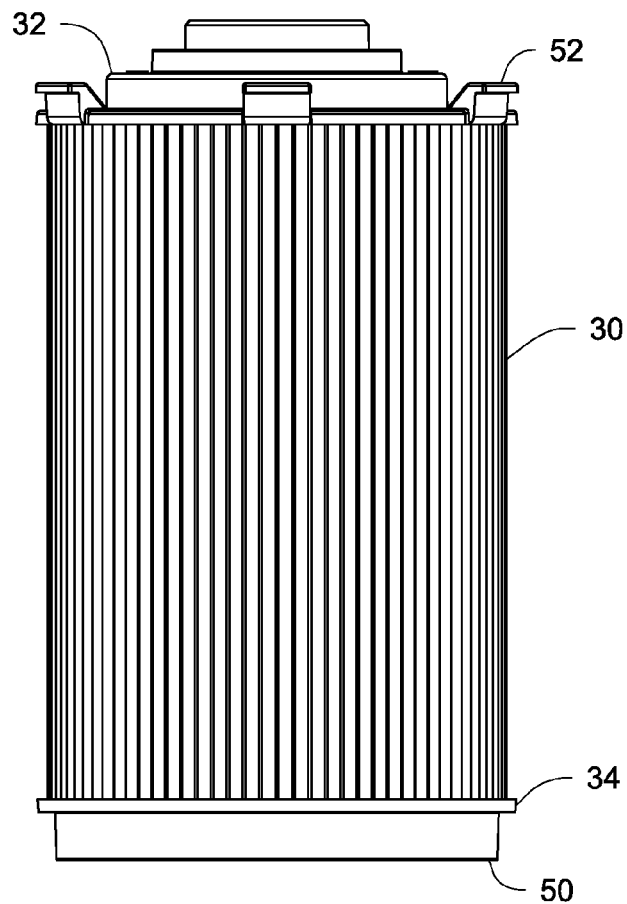
FIG. 11 is a side view of the outer filter element of FIG. 8.
Figure 12:
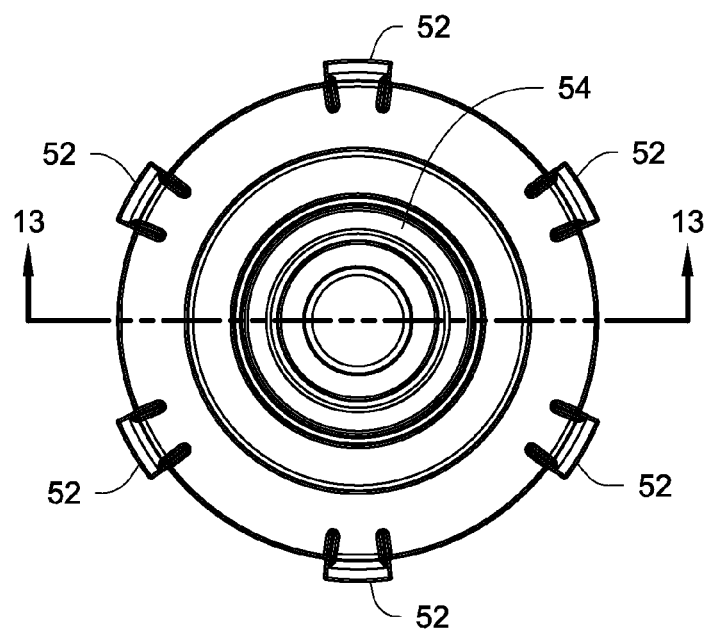
FIG. 12 is an end view of the outer filter element of FIG. 8.
Figure 13:
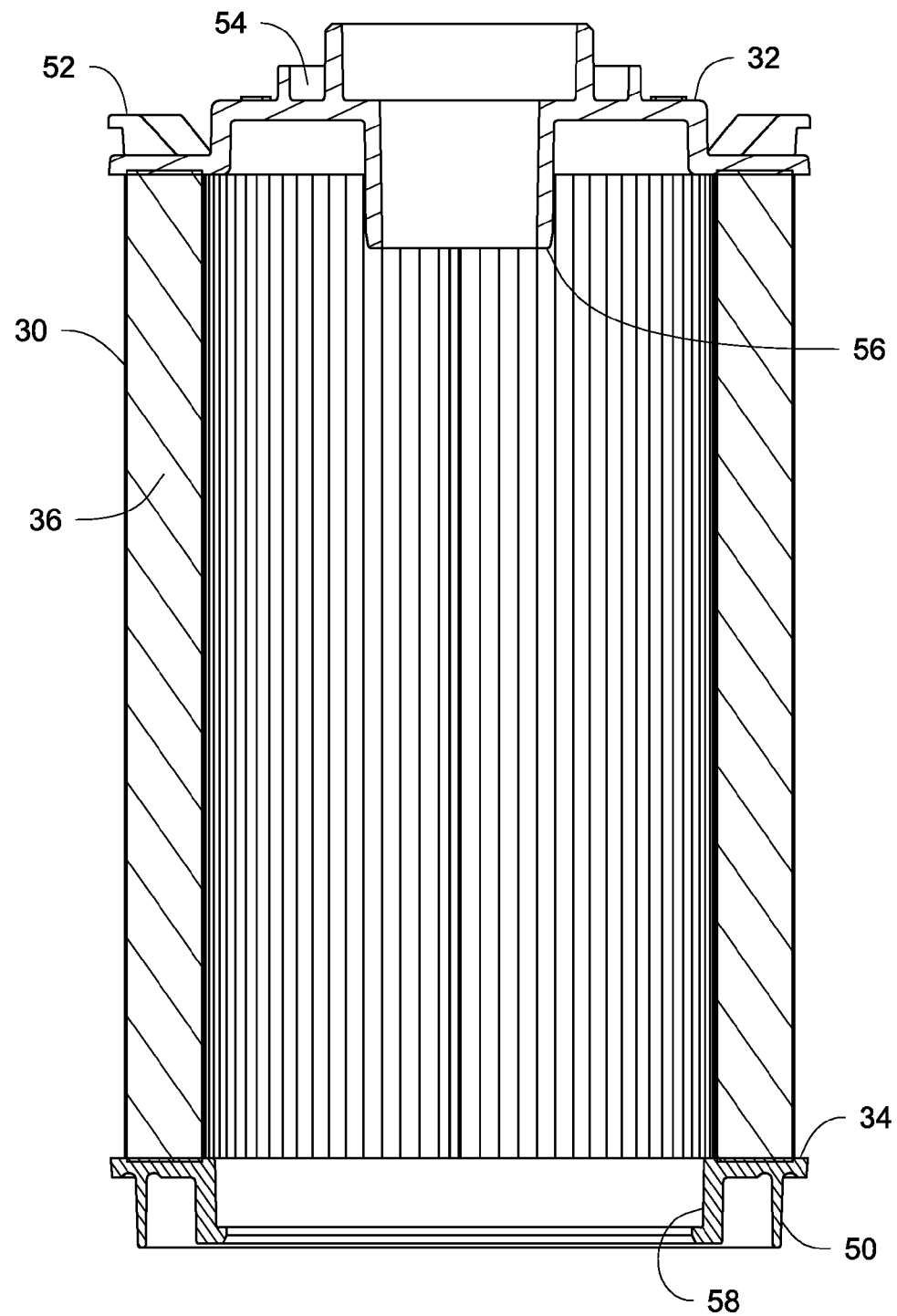
FIG. 13 is a side sectional view of the outer filter element of FIG. 8 taken from FIG. 12.
Figure 14:
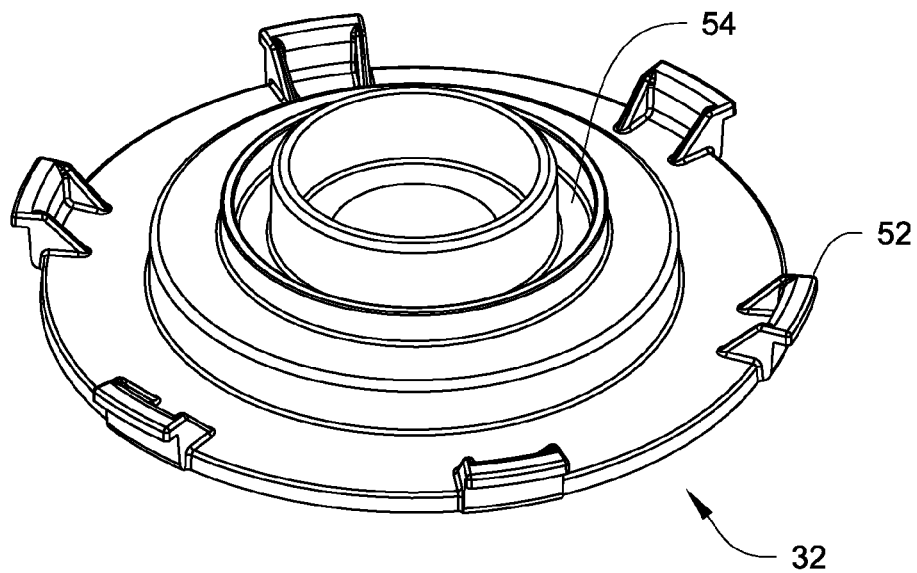
FIG. 14 is a perspective view of a first endplate of the outer filter element of FIG. 8.
Figure 15:
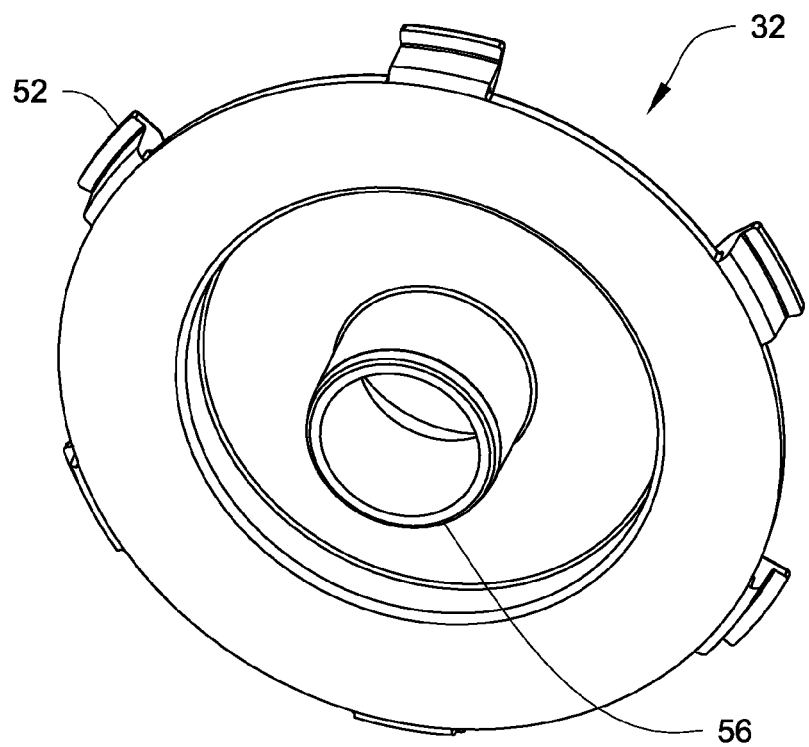
FIG. 15 is another perspective view of the first endplate of FIG. 14.
Figure 16:
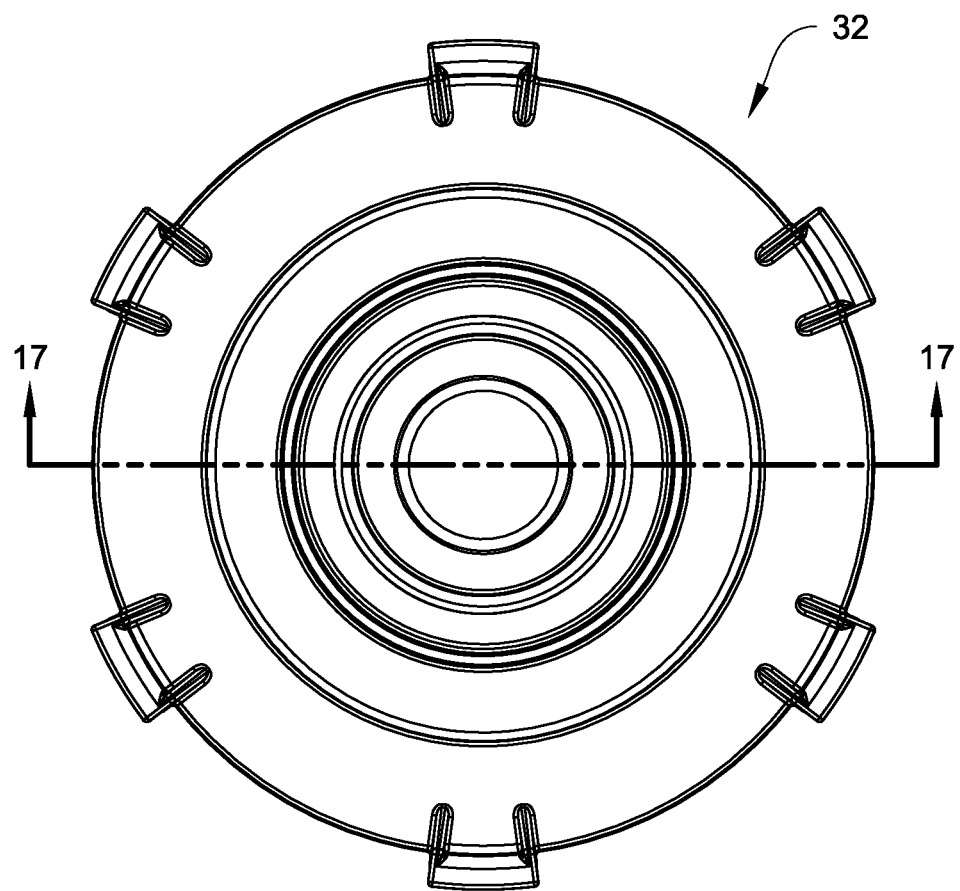
FIG. 16 is an end view of the first endplate of FIG. 14.
Figure 17:
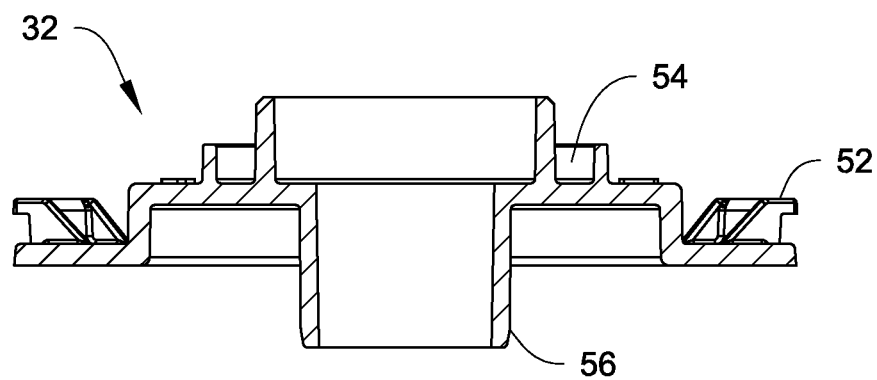
FIG. 17 is a side sectional view the first endplate of FIG. 14 taken from FIG. 16.
Figure 18:
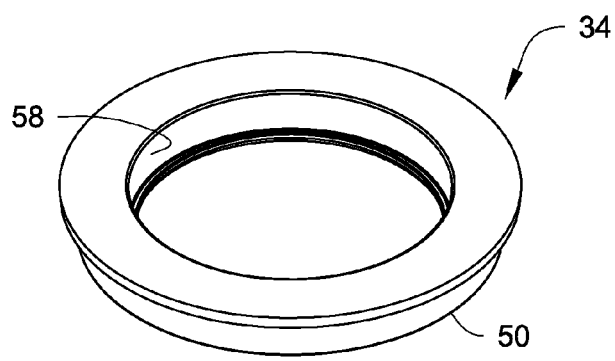
FIG. 18 is a perspective view of a second endplate of the outer filter element of FIG. 8.
Figure 19:
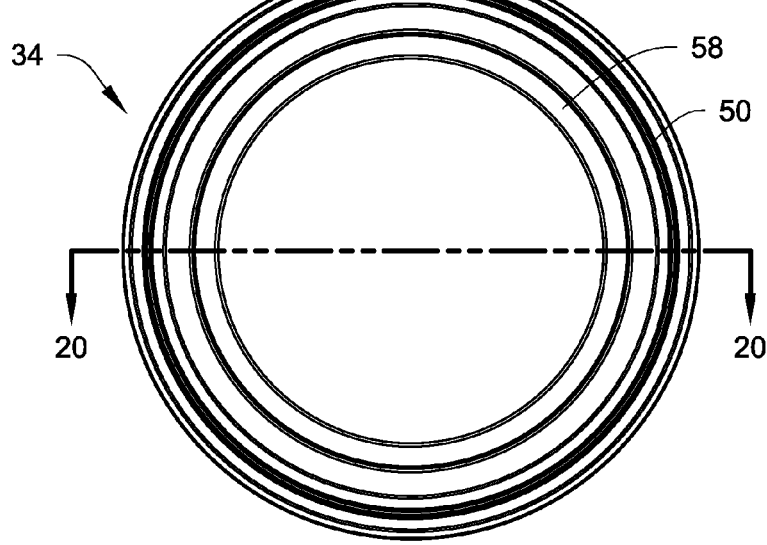
FIG. 19 is an end view of the second endplate of FIG. 18.
Figure 20:
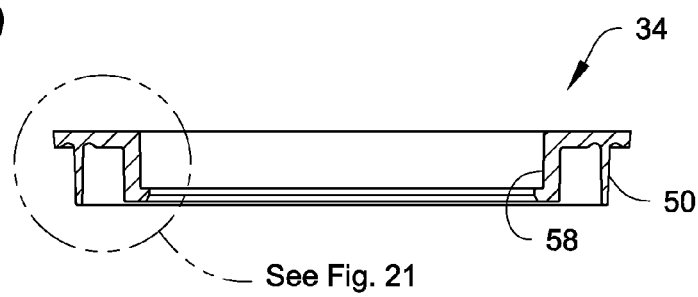
FIG. 20 is a side sectional view of the second endplate of FIG. 18 taken from FIG. 19.
Figure 21:
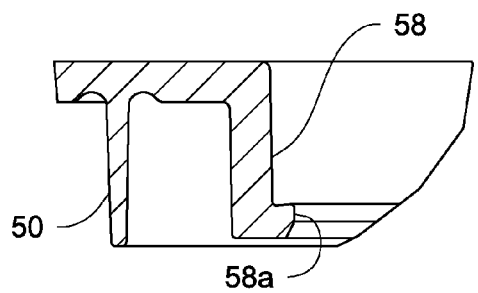
FIG. 21 is a close-up view of a portion of the second endplate of FIG. 18 taken from FIG. 20.

With particular reference to the outer filter element 30, FIGS. 11-13 show the outer filter element 30 alone and FIGS. 14-21 respectively show its first and second endplates 32, 34. The first endplate 32 is connected to one end of the media 36 and the second endplate 34 is connected to the opposite end of the media 36.

The first endplate 32 includes at least one rest member 52 disposed about its outer perimeter. In the example shown, the first endplate 52 for example can have a plurality of rest members 52. The rest members 52 are constructed and arranged as stepped or lipped protrusions that can releasably engage the end ridge of the housing 10.

The first endplate 32 also includes a groove 54 that holds the seal 16 (e.g. gasket or o-ring seal) that can seal to a filter head.

In the example shown, an inner annular flange 56 extends partially into the area surrounded by the media 36 and defines an opening through the first endplate 32. The flange 56 connects with a flange 66 of the first endplate 42 (further described below) of the inner filter element 40 to create the outlet flow passage (e.g. outlet 24). In one preferred example, the flange 56 is connected to the flange 66 of the first endplate 42 in a fluid tight seal, so as to maintain separation of fluid to be filtered from filtered fluid (e.g. 'clean' side from 'dirty' side).

FIGS. 14-17 show the first endplate 32 of the outer filter element 30 alone.

The second endplate 34 includes the sealing flange 50. As discussed, the sealing flange 50 and the inward protruding flange 17 seal against each other when the filter cartridge 20 is inserted into the housing 10. In one embodiment, as shown, the second endplate 34 and sealing flange 50 may be but are not necessarily limited to a bottom endplate and seal configuration for the filter cartridge 20 or at the fluid outlet end of the filter cartridge 20.

In one embodiment, the sealing flange 50 and the inward protruding flange 17 are sealed in a press or interference fit type sealing engagement. In one preferred example as shown, the seal arrangement is a radial/annular seal configuration between the filter cartridge 20 and the housing 10 and, in some cases, the seal arrangement may be along a shelf-like configuration with respect to the protruding flange (see respectively FIGS. 32-42 below). In some examples, either or both of the inward protruding flange 17 (e.g. inner portion of the U-shape) and the sealing flange 50 can be deflectable or deformable to provide a suitable press-fit seal against each other. The press fit seal can be a composite on composite seal, such as plastic on plastic. In one embodiment, the endplate 34 and the housing 10 are constructed of composite materials, such as plastic.

The second endplate 34 further includes an inner annular flange 58. The inner annular flange 58 provides an opening through the second endplate 34 and its surface connects to the second endplate 44 of the inner filter element 40. In one embodiment, the inner annular flange 58 includes a barb or catch 58a (best shown in FIG. 21) that retains the second endplate 44 of the inner filter element 40.

FIGS. 18-21 show the second endplate 34 of the outer filter element 30 alone.

Figure 22:
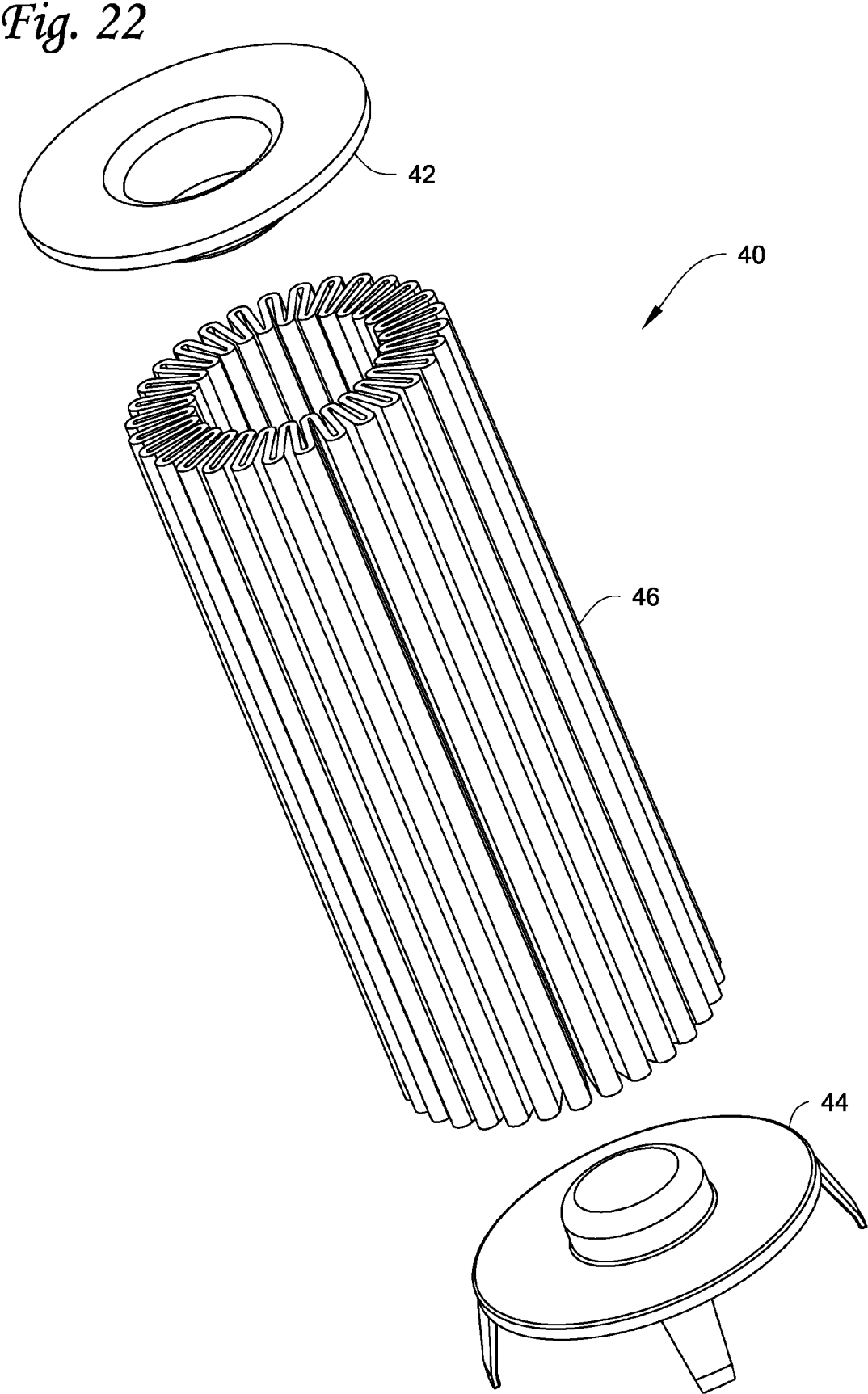
FIG. 22 is a perspective exploded view of the inner filter element of FIG. 8.
Figure 23:
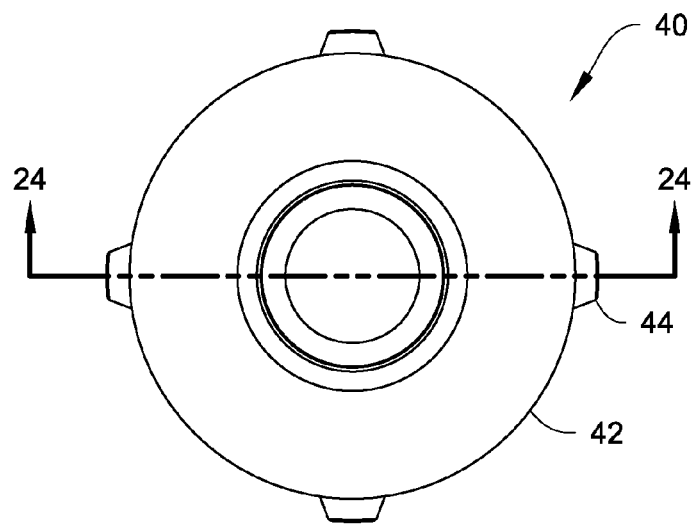
FIG. 23 is an end view of the inner filter element of FIG. 8.
Figure 24:
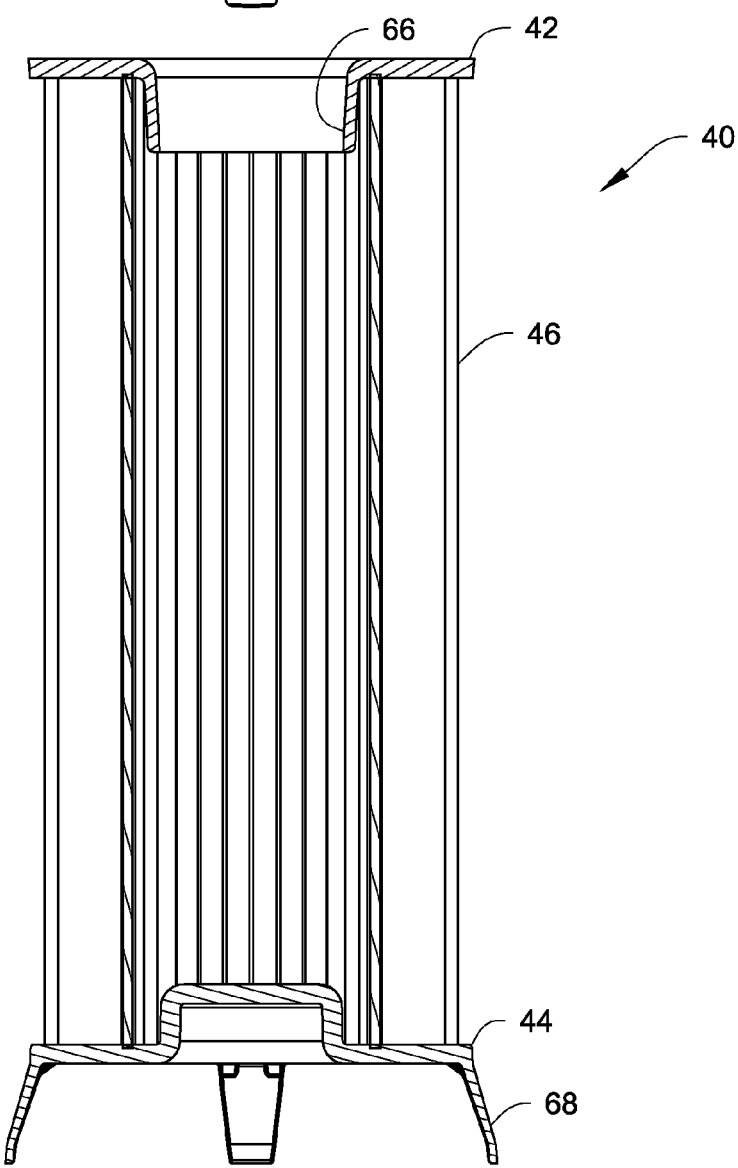
FIG. 24 is a side sectional view of the inner filter element of FIG. 8 taken from FIG. 23.

With particular reference to the inner filter element 40, FIGS. 22-24 show the inner filter element 40 alone and FIGS. 25-30 respectively show its first and second endplates 42, 44. The first endplate 42 is connected to one end of the media 46 and the second endplate 44 is connected to the opposite end of the media 46.

The first endplate 42 includes the inner annular flange 66. In the example shown, the inner annular flange 66 extends partially into the area (e.g. space 48) surrounded by the media 46 and defines an opening through the first endplate 42. As described, the flange 66 connects with the flange 56 of the first endplate 32 (further described below) of the outer filter element 30 to create the outlet flow passage (e.g. outlet 24). In one preferred example, the flange 66 is connected to the flange 56 of the first endplate 32 in a fluid tight seal, so as to maintain separation of fluid to be filtered from filtered fluid (e.g. 'clean' side from 'dirty' side).

Figure 25:
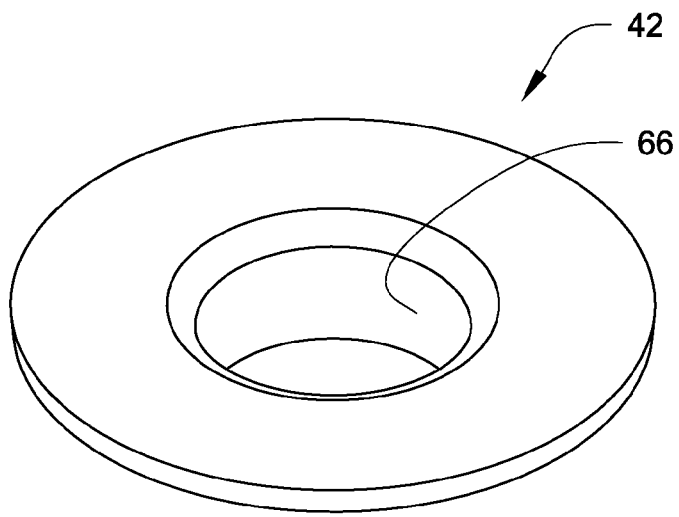
FIG. 25 is a perspective view of a first endplate of the inner filter element of FIG. 8.
Figure 26:
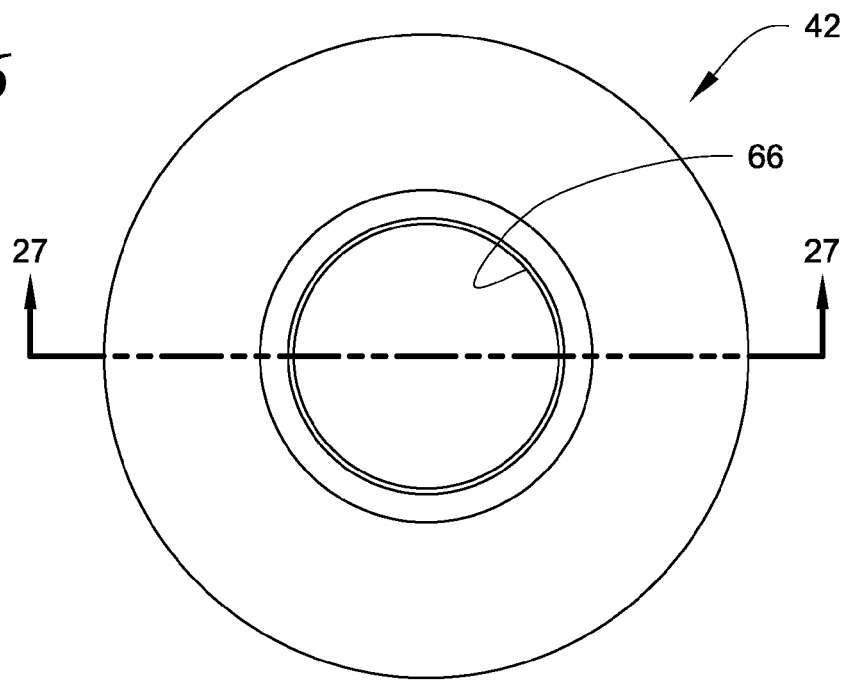
FIG. 26 is an end view of the first endplate of FIG. 25.
Figure 27:
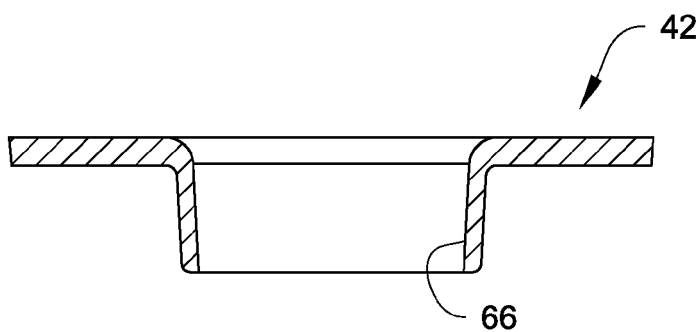
FIG. 27 is side sectional view of the first endplate of FIG. 25 taken from FIG. 26.

FIGS. 25-27 show the first endplate 42 of the inner filter element 40 alone.

The second endplate 44 includes a planar surface 62 with a protrusion 64 thereon that closes and seals one end of the space 48 within the second media 46.

The second endplate 44 includes legs 68 extending from one side of the second plate member 44. In one embodiment, the legs 68 are disposed on the side opposite the planar surface 62. In one embodiment, legs 68 extend beyond an outer perimeter of the second endplate 44. In operation for example, legs 68 provide a standoff feature for the second endplate 44 and cooperate with the inner annular flange 58 of the second endplate 34 of the outer filter element 30. For example, the legs 68 engage the barb or catch 58a of the second endplate 34 of the outer filter element 30, and can help retain the second endplate 44 of the inner filter element 40. Further, the legs 68 and inner annular flange 58 create the drain channel(s) by allowing a gap for fluid to drain from the space 38 between the media 36, 46 into the reservoir cavity 18 (e.g. water separated from fuel). See e.g. arrows in FIG. 10. and FIG. 2.

Figure 28:
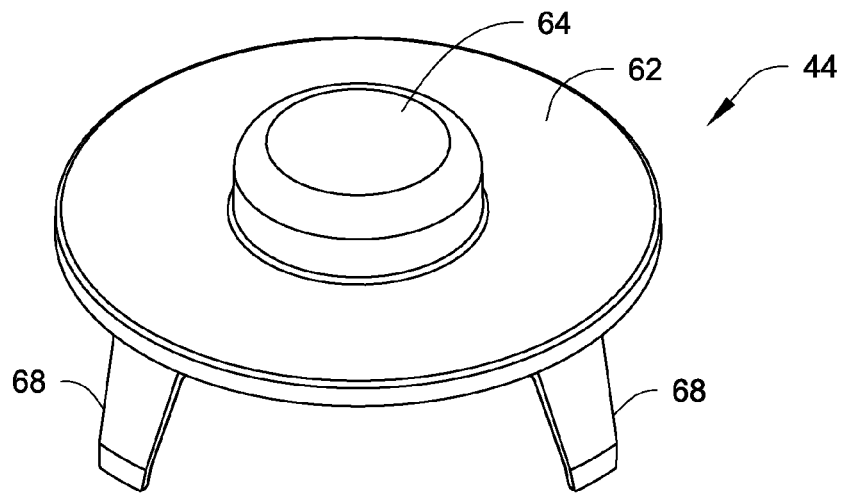
FIG. 28 is a perspective view of a second endplate of the inner filter element of FIG. 8.
Figure 29:
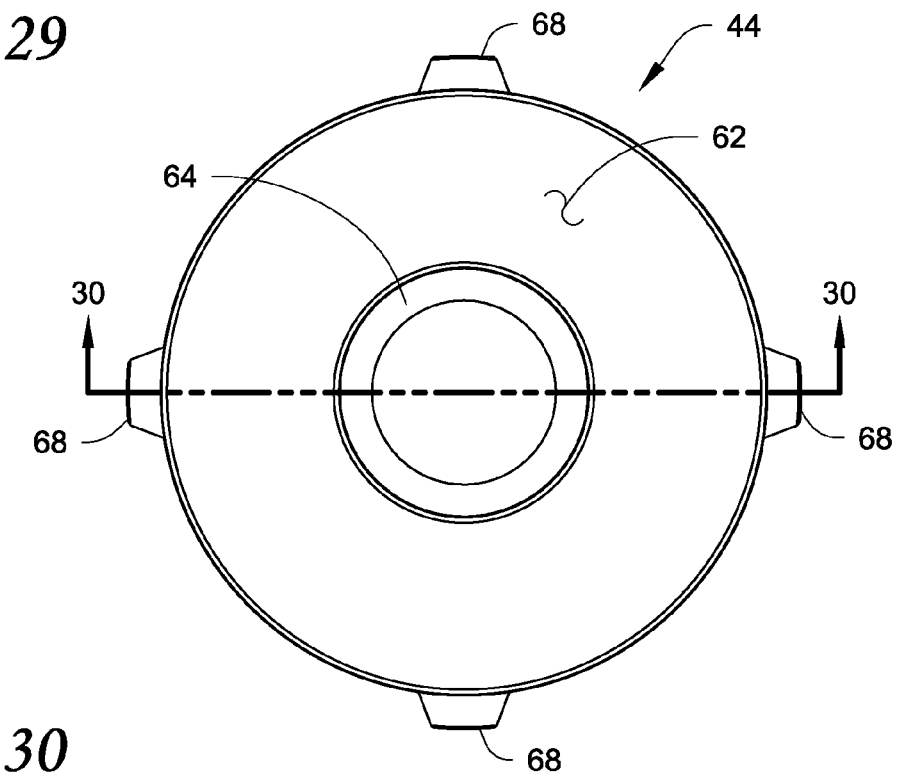
FIG. 29 is an end view of the second endplate of FIG. 28.
Figure 30:
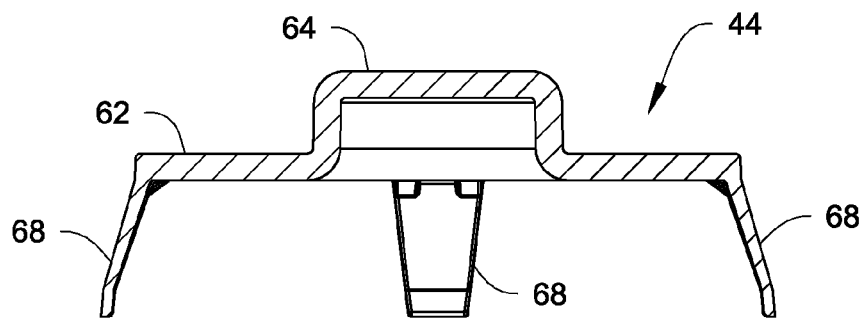
FIG. 30 is a side sectional view of the second endplate of FIG. 28 taken from FIG. 29.
Figure 31:
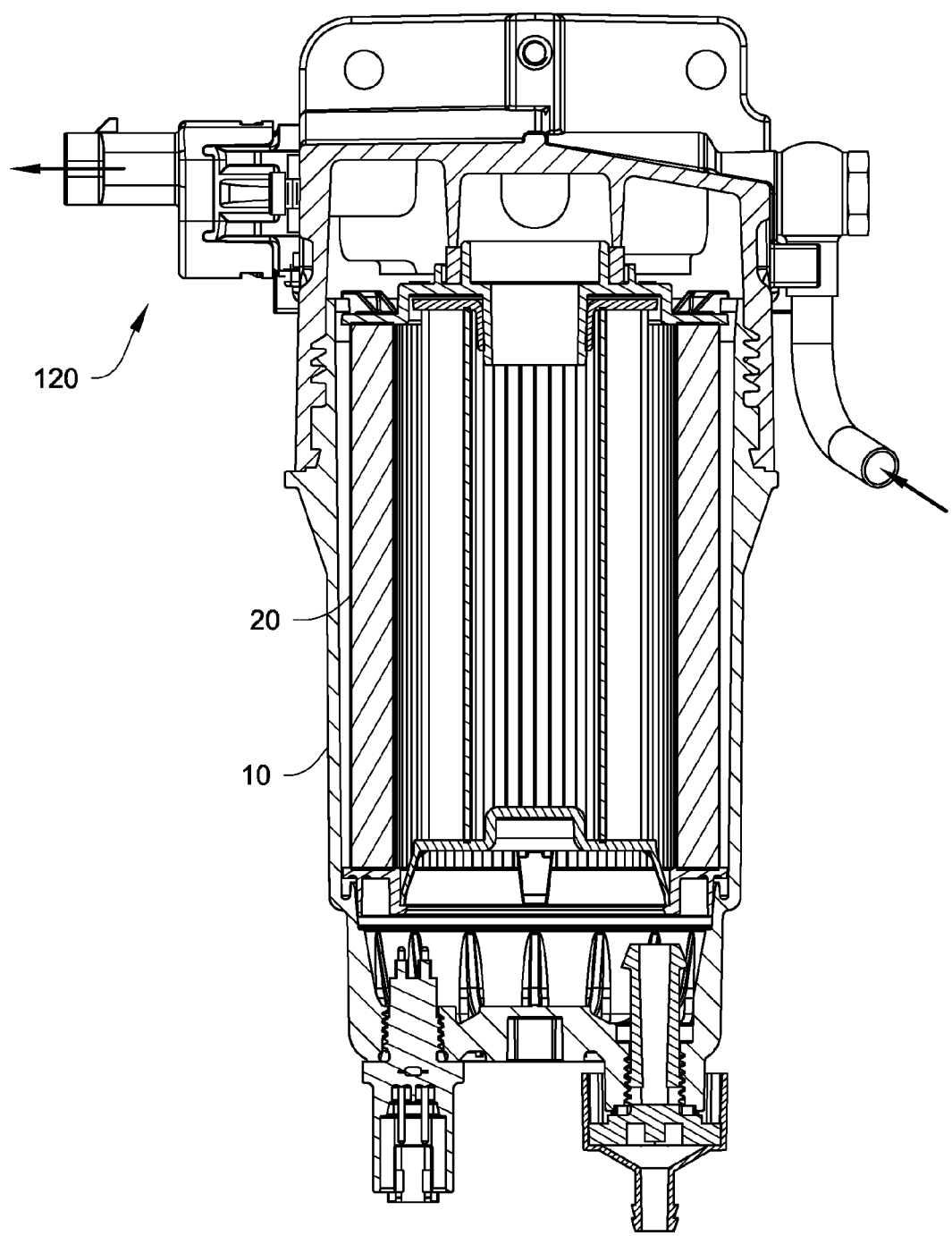
FIG. 31 is a side sectional view of the filter cartridge and housing assembled with a filter head.

FIGS. 28-30 show the second endplate 44 of the inner filter element 40 alone.

FIG. 31 shows the assembly of the filter cartridge 20 and housing 10 connected to a filter head 120. FIG. 31 shows one example where the assembly of the filter cartridge 20 and housing 10 can connect and seal with existing filter heads being used. In the example shown in FIG. 31, the filter head 120 is connectable to the housing 10 through a threaded engagement with threads 12 of the housing 10 and a sealing engagement with the sealing groove 14 (o-ring inside as shown in FIG. 31). Flow through the filter head 120 can enter the line as shown on the right of the filter head 120 which is in fluid communication with the inlet 22, and fluid flow can exit the line as shown at the left of the filter head 120 which is in fluid communication with the outlet 24 (see arrows).

In general, a filter cartridge has been described above that includes an outer filter element with a sealing flange on an endplate that directly seals with an interior surface of the housing. In the embodiment described above, for example, the filter cartridge 20 can be inserted into the housing 10, and has a sealing flange that can be sealed against the inward protruding flange 17 of the housing 10 in a fluid tight seal. The seal between the filter cartridge 20 and the protruding flange 17 separates the filtration cavity 11 from the reservoir cavity 18.

With further reference to the embodiment described above, the sealing flange 50 and the inward protruding flange 17 are sealed in a press or interference fit type sealing engagement. In one preferred example as shown, the seal arrangement a radial/annular seal configuration between the filter cartridge 20 and the housing 10. In some examples, either or both of the inward protruding flange 17 (e.g. inner portion of the U-shape) and the sealing flange 50 can be deflectable or deformable to provide a suitable press-fit seal against each other. The press fit seal can be a composite on composite seal, such as plastic on plastic. In one embodiment, the endplate 34 and the housing 20 are constructed of composite materials, such as plastic.

It will be appreciated that the embodiment shown in FIGS. 1-31 is not meant to be limiting to the specific seal interface shown between the endplate 34 and housing 10. Other configurations may be contemplated in various alternatives, for example as illustrated in FIGS. 32-42. Similar concepts may also apply to FIGS. 32-42 as in FIGS. 1-31, such as the seal arrangement being a radial/annular seal configuration between the filter cartridge 20 and the housing 10, and the seal arrangement also being, in some cases as appropriate, along a shelf-like configuration with respect to the protruding flange 17 of the housing. Likewise, either or both of the inward protruding flange 17 (e.g. inner portion of the U-shape) and the alternative sealing flanges described in FIGS. 32-42, where appropriate, can be deflectable or deformable to provide a suitable press-fit seal against each other. As with the embodiment of FIGS. 1-31, the seal shown in FIGS. 32-42 can be a press fit seal, such as a composite on composite seal (e.g. plastic on plastic) or a thermoplastic/elastomer material on plastic seal. As above, the endplate 34 and the housing 10 shown in FIGS. 32-42 also can be constructed of composite materials, such as plastic.

With specific reference to FIGS. 32-42, such alternative sealing interfaces are described, where alternative sealing flanges seal to at least one of the inner surface of the inward protruding flange 17 and/or within a groove defined by the inward protruding flange 17.

Figure 32:
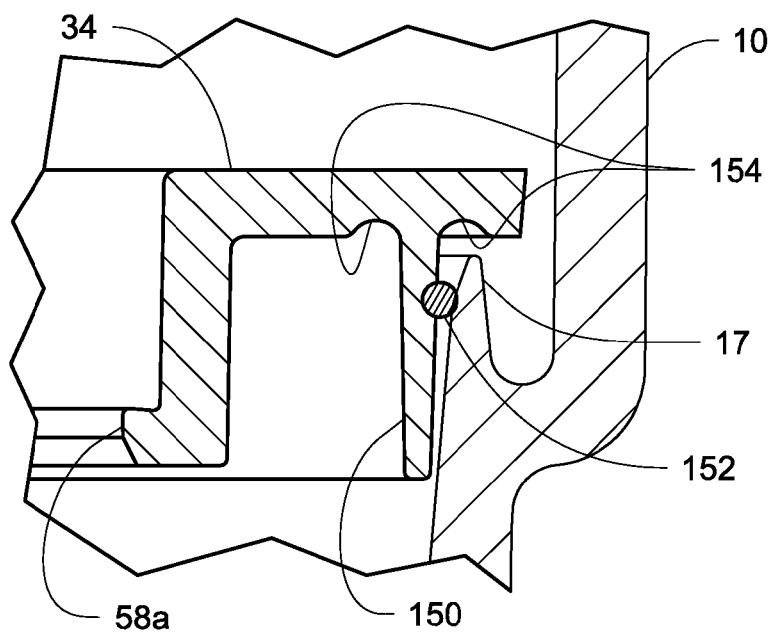
FIG. 32 is a partial sectional view showing another embodiment of a seal interface between the second endplate of the outer filter element and the housing.

FIG. 32 is a partial sectional view showing another embodiment of a seal interface between the second endplate 34 of the outer filter element and the housing 10. The endplate 34 includes the inner annular flange with a barb or catch 58a, but with a modified outer flange 150. As shown, the flange 150 includes a seal member 152, which may be an o-ring, disposed on its outer surface. The seal member 152 engages the inner surface of the inward protruding flange 17 to seal with the housing. As shown, the seal member 152 is an o-ring, however it will be appreciated that any suitable seal member may be employed. As another example, the seal member may be an appropriate gasket structure. As above in FIG. 20, for example, the endplate 34 may also have recesses 154 that allow the flange 150 to be more easily deformed/deflected when press fitting the endplate 34 to the housing.

Figure 33:
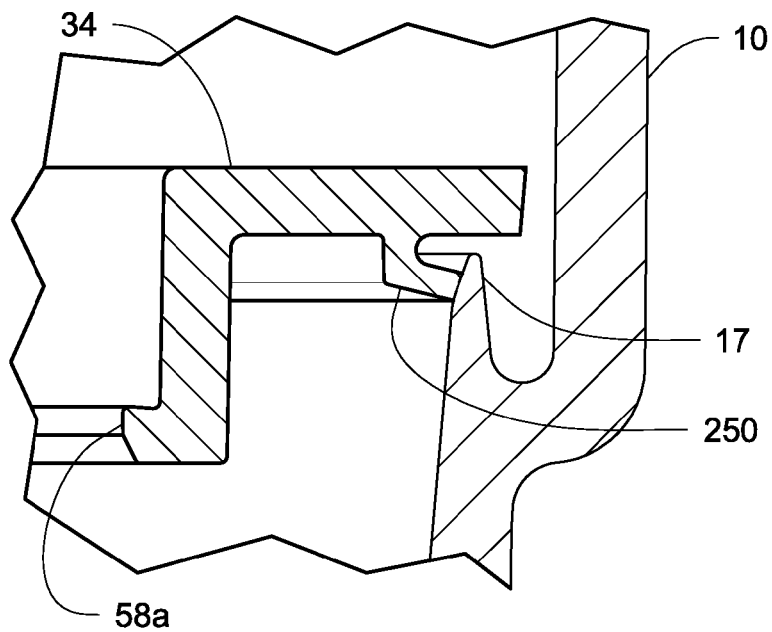
FIG. 33 is a partial sectional view showing another embodiment of a seal interface between the second endplate of the outer filter element and the housing.

FIG. 33 is a partial sectional view showing another embodiment of a seal interface between the second endplate 34 of the outer filter element and the housing 10. The endplate 34 includes the inner annular flange with a barb or catch 58a, but with a modified outer flange 250. As shown, the flange 250 is structured as a flexible finger that seals to the inner surface of the inward protruding flange 17 of the housing 10. The flexible finger as shown extends downwardly and then away from the center of the endplate 34 (e.g. toward the inward protruding flange 17), and may be deflectable for example along its outer curve changing from downward and then away from the endplate 34 (e.g. toward the flange 17).

Figure 34:
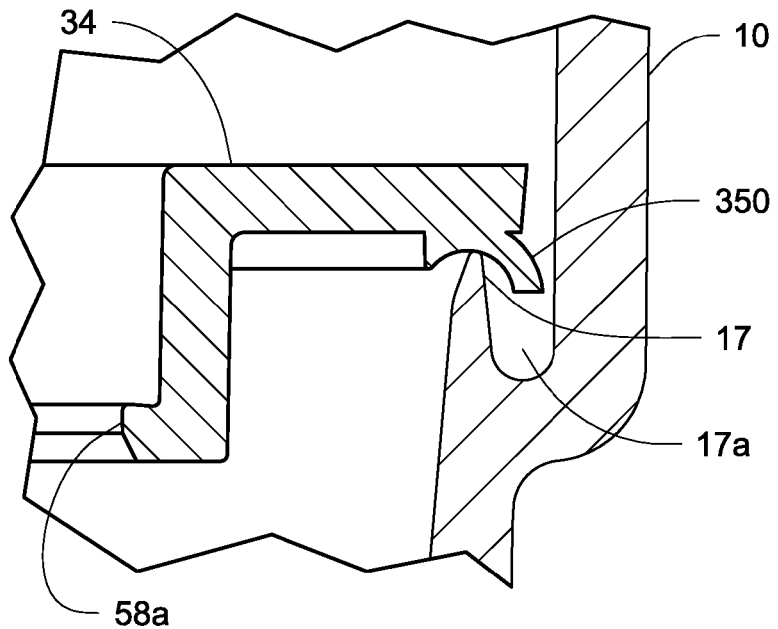
FIG. 34 is a partial sectional view showing another embodiment of a seal interface between the second endplate of the outer filter element and the housing.

FIG. 34 is a partial sectional view showing another embodiment of a seal interface between the second endplate 34 of the outer filter element and the housing 10. The endplate 34 includes the inner annular flange with a barb or catch 58a, but with a modified outer flange 350. As shown, the flange 350 is structured as a curved overlap that curls over the top rim of the inward protruding flange 17. The flange 350 on one side partially extends into a groove 17a of the inward protruding flange 17. When the filter cartridge is inserted into the housing, the press fit can be along the top rim of the inward protruding flange 17 and the under curvature of the flange 350. The under curvature is configured as the sealing surface.

Figure 35:
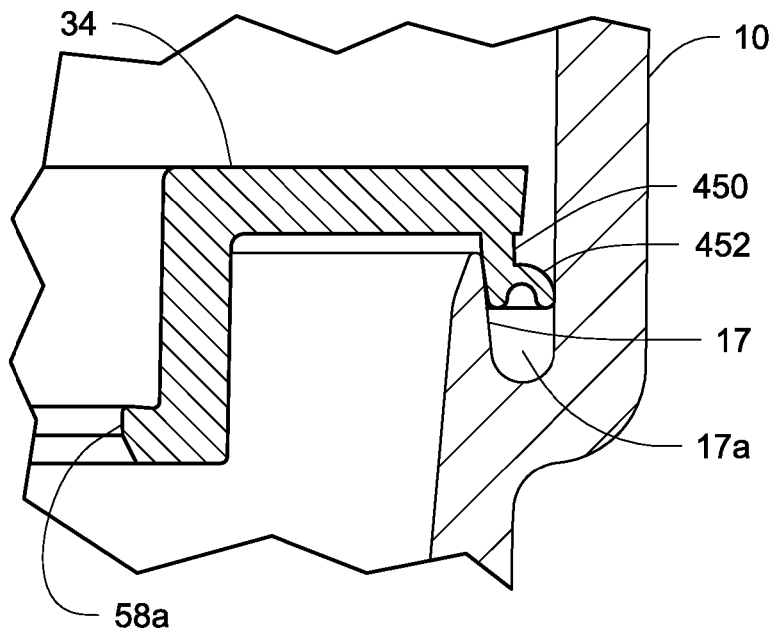
FIG. 35 is a partial sectional view showing another embodiment of a seal interface between the second endplate of the outer filter element and the housing.

FIG. 35 is a partial sectional view showing another embodiment of a seal interface between the second endplate 34 of the outer filter element and the housing 10. The endplate 34 includes the inner annular flange with a barb or catch 58a, but with a modified outer flange 450. As shown, the flange 450 is structured as a deformable grooved finger. The flange 450 can be inserted downward into a groove 17a of the inward protruding flange 17. The flange 450 extends into the groove 17a, where the grooved finger structure has a width that slightly larger than the width of the groove to create a press fit seal when the endplate 34 engages the housing 10. In one embodiment, the fingered structure has two fingers 452 commonly connected to the endplate 34 with a groove therebetween to allow some deformation during connection.

Figure 36:
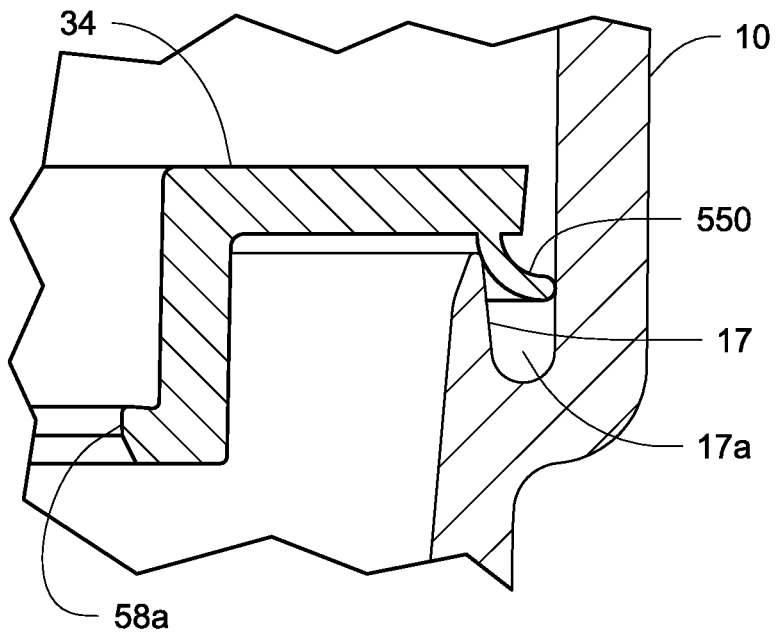
FIG. 36 is a partial sectional view showing another embodiment of a seal interface between the second endplate of the outer filter element and the housing.

FIG. 36 is a partial sectional view showing another embodiment of a seal interface between the second endplate 34 of the outer filter element and the housing 10. The endplate 34 includes the inner annular flange with a barb or catch 58a, but with a modified outer flange 550. As shown, the flange 550 is a flexible finger that seals against the inside wall of the housing 10. The flange 550 can be inserted downward into a groove 17a of the inward protruding flange 17. The flange 550 extends downward and away from a center of the endplate 34. In the embodiment shown, the end of the flange 550 curls toward the inner wall of the housing 10. When the endplate 34 engages the housing 10, the end of the flange 550 presses against the inner wall of the housing 10 to create a seal.

Figure 37:
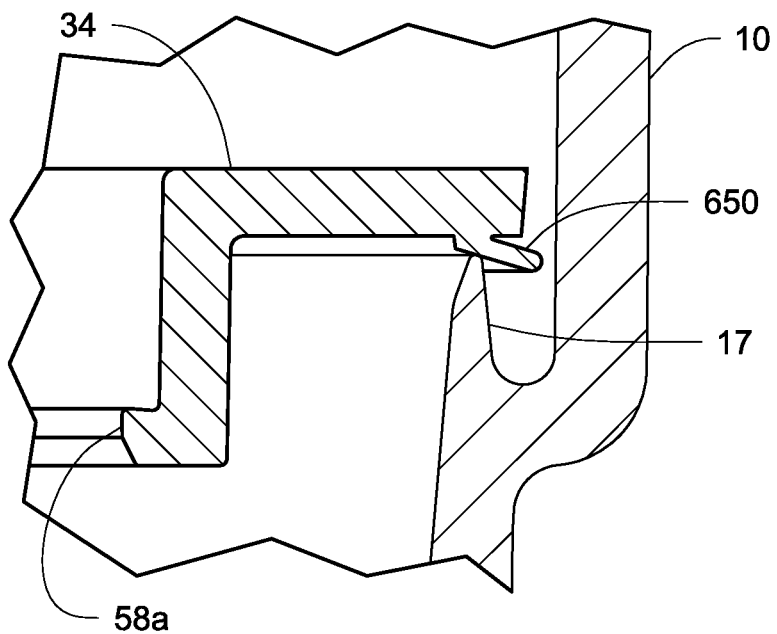
FIG. 37 is a partial sectional view showing another embodiment of a seal interface between the second endplate of the outer filter element and the housing.

FIG. 37 is a partial sectional view showing another embodiment of a seal interface between the second endplate 34 of the outer filter element and the housing 10. The endplate 34 includes the inner annular flange with a barb or catch 58a, but with a modified flange 650. As shown, the flange 650 is a flexible finger to seals to the top rim of the inward protruding flange 17. Similar to FIG. 33, the flange 650 extends downward and away from the center of the endplate 34. The flexible finger may be deflectable for example along its outer curve when changing from downward and then toward the inner wall of the housing 10 (e.g. away from the center of the endplate). The flexible finger has an under surface configured as the sealing surface.

Figure 38:
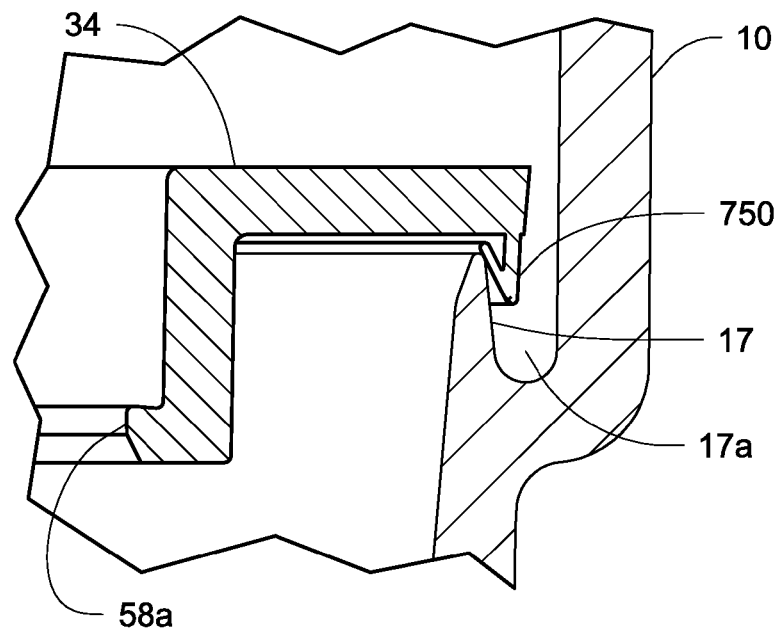
FIG. 38 is a partial sectional view showing another embodiment of a seal interface between the second endplate of the outer filter element and the housing.

FIG. 38 is a partial sectional view showing another embodiment of a seal interface between the second endplate 34 of the outer filter element and the housing 10. The endplate 34 includes the inner annular flange with a barb or catch 58a, but with a modified outer flange 750. As shown, the flange 750 seals against the inward protruding flange on a surface within a groove 17a. The flange 750 extends downward and then upward at an angle, such that when the endplate 34 is engaged with the housing 10, the flange 750 seals with the inward protruding flange 17 on the surface within the groove 17a. The flange 750 may be flexible along its change of direction from downward to upward at an angle. The flange 750 has an under surface configured as a sealing surface.

Figure 39:
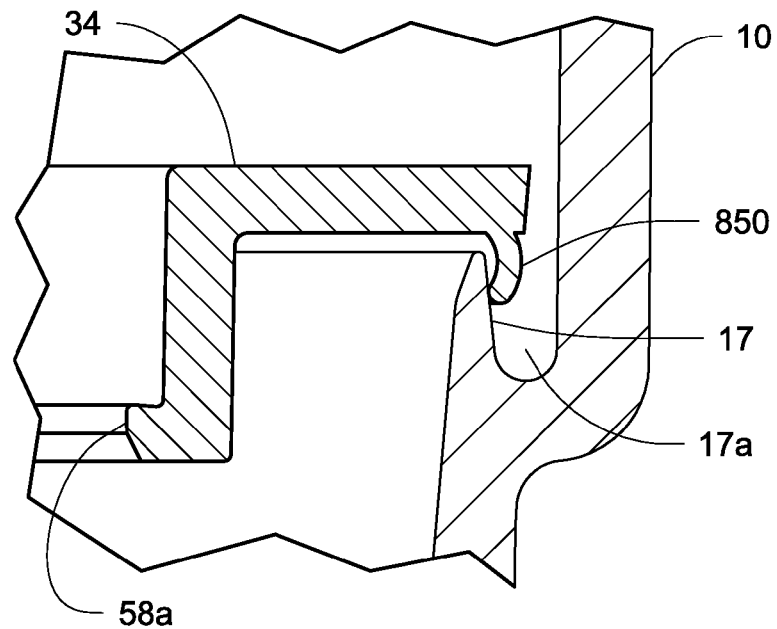
FIG. 39 is a partial sectional view showing another embodiment of a seal interface between the second endplate of the outer filter element and the housing.

FIG. 39 is a partial sectional view showing another embodiment of a seal interface between the second endplate 34 of the outer filter element and the housing 10. The endplate 34 includes the inner annular flange with a barb or catch 58a, but with a modified outer flange 850. As with FIG. 38, the flange 850 as shown seals against the inward protruding flange 17 on a surface within a groove 17a. The flange 850 extends downward and is curved toward the center of the second endplate 34 (e.g. toward the inward protruding flange 17), such that when the endplate 34 is engaged with the housing 10, the flange 850 seals with the inward protruding flange 17 on the surface within the groove 17a. The flange 850 may be flexible along its curvature and includes an end distal surface as the sealing surface.

Figure 40:
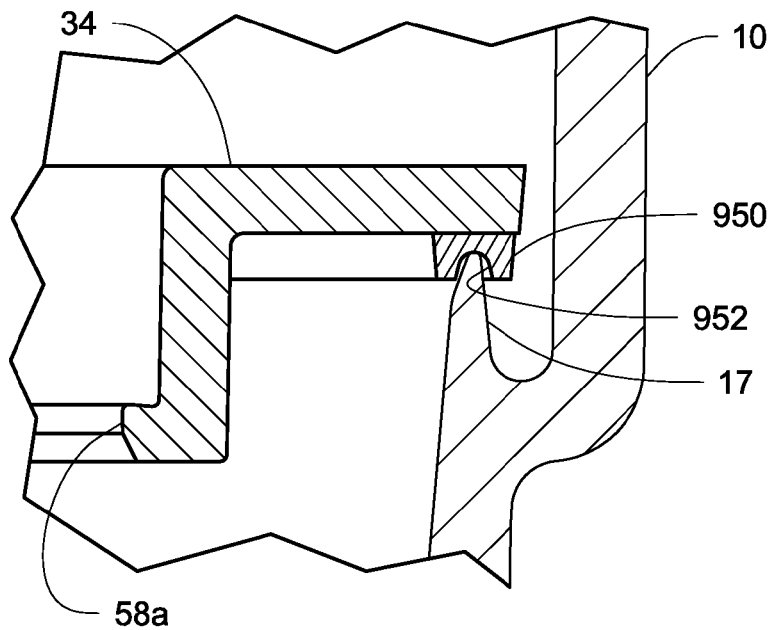
FIG. 40 is a partial sectional view showing another embodiment of a seal interface between the second endplate of the outer filter element and the housing.

FIG. 40 is a partial sectional view showing another embodiment of a seal interface between the second endplate 34 of the outer filter element and the housing 10. The endplate 34 includes the inner annular flange with a barb or catch 58a, but with a modified outer flange 950. As shown, the flange 950 is structured as an attached elastomer member on an underside of the endplate 34. The elastomer member is a flexible material. The flange 950 extends downward onto the top rim of the inward protruding flange 17. The flange 950 in some embodiments such as shown includes a groove 952 as a sealing surface that can receive the top rim. When the filter cartridge is inserted into the housing 10, the endplate 34 can engage the inward protruding flange 17 of the housing in a press fit sealing engagement.

Figure 41:
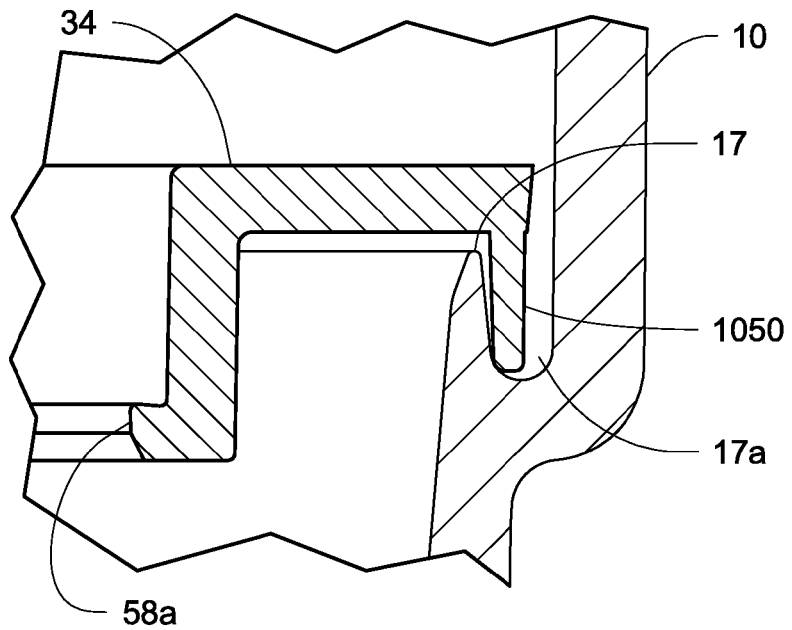
FIG. 41 is a partial sectional view showing another embodiment of a seal interface between the second endplate of the outer filter element and the housing.

FIG. 41 is a partial sectional view showing another embodiment of a seal interface between the second endplate 34 of the outer filter element and the housing 10. The endplate 34 includes the inner annular flange with a barb or catch 58a, but with a modified outer flange 1050. As shown, the flange 1050 is similar to the flange 50, but rather than sealing to the side surface of the inward protruding flange, the flange 1050 extends into and seals to a groove 17a of the inward protruding flange 17, such as in a direct plastic to plastic interface.

Figure 42:
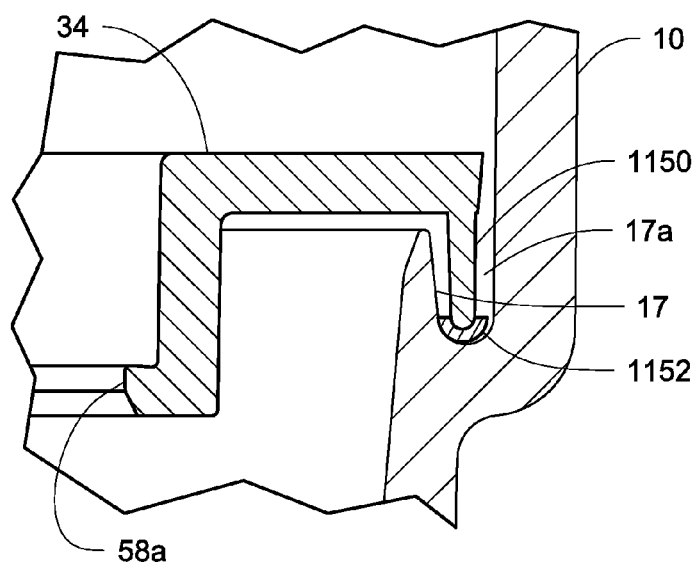
FIG. 42 is a partial sectional view showing another embodiment of a seal interface between the second endplate of the outer filter element and the housing.

FIG. 42 is a partial sectional view showing another embodiment of a seal interface between the second endplate 34 of the outer filter element and the housing 10. The endplate 34 includes the inner annular flange with a barb or catch 58a, but with a modified outer flange 1150. As shown, the flange 1150 is similar to the flange 1050, but the flange 1150 includes an additional elastomer member 1152 on the end tip of the flange 1150. The flange 1150 extends into and seals to a groove 17a of the inward protruding flange 17, through the elastomer member 1152.

As discussed, the improved sealing structure herein is useful for example in filter within a filter arrangements directed towards multi-phase filtration (e.g. separation of water and particulates from fuel in engines), where a working fluid is prevented from bypassing the outer filter element before it reaches an inner filter element. The inventive concepts herein can provide effective filtration and protection of engine components.

While the above is a complete description of the preferred embodiments of the invention, various alternatives, modifications, and equivalents may be used. Therefore, the above description should not be taken as limiting the scope of the invention which is defined by the appended claims.

We claim:

1. A filter cartridge comprising:
an outer filter element; and
an inner filter element,
the outer and inner filter elements each have a respective filtering media, the media of the outer filter element is concentrically arranged around the media of the inner filter element, a first space is defined between the outer and inner filter elements, and a second space is defined within the inner filter element,
the outer filter element has a first endplate connected at a first end and a second endplate connected at an opposing second end,
the inner filter element has a first endplate connected at a first end and a second endplate connected at an opposing second end,
the second endplate of the outer filter element and the second endplate of the inner filter element directly contact each other and define a drain channel, the second endplate of the outer filter element connectable with the second endplate of the inner filter element, the first space between the outer and inner filter elements is in fluid communication with the drain channel allowing fluid to flow therethrough,
the inner filter element defines an outlet flow passage, the second space within the inner filter element is in fluid communication with the outlet flow passage, and
wherein the second endplate of the outer filter element includes a sealing flange surrounding the drain channel, wherein the second endplate of the outer filter element includes an inner annular flange that includes a barb, and wherein the second endplate of the inner filter element includes legs that engage the barb so as to retain the second endplate of the inner filter element.

2. The filter cartridge of claim 1, wherein the first endplate of the outer filter element includes at least one rest member disposed at its outer perimeter, the rest member constructed as a stepped protrusion.

3. The filter cartridge of claim 1, wherein the second endplate of the outer filter element and the sealing flange are arranged as a bottom endplate structure of the cartridge.

4. The filter cartridge of claim 1, wherein the sealing flange is a deflectable structure.

5. The filter cartridge of claim 1, wherein the sealing flange includes a groove and a seal member disposed within the groove.

6. The filter cartridge of claim 1, wherein the sealing flange is a flexible finger, the flexible finger extends downwardly from the second endplate of the outer filter element and then away from a center of the second endplate, the sealing flange being deflectable along an outer curve changing from downward to away from the second endplate.

7. The filter cartridge of claim 1, wherein the sealing flange is structured as a curved overlap having an undercurve configured as a sealing surface.

8. The filter cartridge of claim 1, wherein the sealing flange is a deformable grooved finger, the deformable grooved finger having a two finger structure commonly connected to the second endplate of the outer filter element with a groove between the two fingers.

9. The filter cartridge of claim 1, wherein the sealing flange is a flexible finger, the flexible finger extends downwardly from the second endplate of the outer filter element and then away from a center of the second endplate, the sealing flange being deflectable along an outer curve changing from downward to away from the second endplate, and has an under surface configured as a sealing surface.

10. The filter cartridge of claim 1, wherein the sealing flange extends downward from the second endplate of the outer filter element and then upward at an angle toward a center of the second endplate, the sealing flange being deflectable along a change of direction from downward to upward at an angle relative to the second endplate, and has an under surface configured as a sealing surface.

11. The filter cartridge of claim 1, wherein the sealing flange extends downward from the second endplate of the outer filter element and has a curvature toward a center of the second endplate, the sealing flange being deflectable along the curvature and has an end distal surface configured as a sealing surface.

12. The filter cartridge of claim 1, wherein the sealing flange is structured as an attached elastomer member on an underside of the second endplate of the outer filter element, and has a groove as a sealing surface.

13. The filter cartridge of claim 1, wherein the sealing flange includes an elastomer member disposed on an end tip of the flange.

14. The filter cartridge of claim 1, wherein the second endplate of the outer filter element includes a first face attached to the filtering media and a second face opposite the first face, the sealing flange extending from the second face.

15. A filter cartridge comprising:
an outer filter element; and
an inner filter element,
the outer and inner filter elements each have a respective filtering media, the media of the outer filter element is concentrically arranged around the media of the inner filter element, a first space is defined between the outer and inner filter elements, and a second space is defined within the inner filter element,
the outer filter element has a first endplate connected at a first end and a second endplate connected at an opposing second end,
the inner filter element has a first endplate connected at a first end and a second endplate connected at an opposing second end,
the second endplate of the outer filter element and the second endplate of the inner filter element directly contact each other and define a drain channel, the second endplate of the outer filter element connectable with the second endplate of the inner filter element, the first space between the outer and inner filter elements is in fluid communication with the drain channel allowing fluid to flow therethrough,
the inner filter element defines an outlet flow passage, the second space within the inner filter element is in fluid communication with the outlet flow passage, and
wherein the second endplate of the outer filter element includes a sealing flange surrounding the drain channel,
wherein the first endplate of the outer filter element and the first endplate of the inner filter element are connected in a press fit arrangement, and the second endplate of the outer filter element and the second endplate of the inner filter element are connected in a press fit arrangement.

16. A filter cartridge comprising:
an outer filter element; and
an inner filter element,
the outer and inner filter elements each have a respective filtering media, the media of the outer filter element is concentrically arranged around the media of the inner filter element, a first space is defined between the outer and inner filter elements, and a second space is defined within the inner filter element,
the outer filter element has a first endplate connected at a first end and a second endplate connected at an opposing second end,
the inner filter element has a first endplate connected at a first end and a second endplate connected at an opposing second end,
the second endplate of the outer filter element and the second endplate of the inner filter element directly contact each other and define a drain channel, the second endplate of the outer filter element connectable with the second endplate of the inner filter element, the first space between the outer and inner filter elements is in fluid communication with the drain channel allowing fluid to flow therethrough,
the inner filter element defines an outlet flow passage, the second space within the inner filter element is in fluid communication with the outlet flow passage,
wherein the second endplate of the outer filter element includes a sealing flange surrounding the drain channel and
wherein the outer filter element includes an inner annular flange that extends into the second space defined within the inner filter element, and the inner filter element includes an inner annular flange that extends into the second space defined within the inner filter element, the inner annular flanges are connected in a fluid tight seal and create the outlet flow passage.

17. A filtration assembly comprising a filter cartridge within a housing:
   the filter cartridge including:
   an outer filter element; and
   an inner filter element,
   the outer and inner filter elements each have a respective filtering media, the media of the outer filter element is concentrically arranged around the media of the inner filter element, a first space is defined between the outer and inner filter elements, and a second space is defined within the inner filter element,
   the outer filter element has a first endplate connected at a first end and a second endplate connected at an opposing second end,
   the inner filter element has a first endplate connected at a first end and a second endplate connected at an opposing second end,
   the second endplate of the outer filter element and the second endplate of the inner filter element directly contact each other and define a drain channel, the second endplate of the outer filter element connectable with the second endplate of the inner filter element, the first space between the outer and inner filter elements is in fluid communication with the drain channel allowing fluid to flow therethrough,
   the inner filter element defines an outlet flow passage, the second space within the inner filter element is in fluid communication with the outlet flow passage, and
   wherein the second endplate of the outer filter element includes a sealing flange surrounding the drain channel; and
   the housing has a generally open end where the filter cartridge can be inserted, a gap between an outer perimeter of the filter cartridge and an inner perimeter of the housing at the open end defines an inlet flow passage,
   the housing includes a reservoir cavity and a filtration cavity defined by an inward protruding flange, the inward protruding flange and the sealing flange of the second endplate of the outer filter element are in a sealing arrangement, to fluidly separate the reservoir cavity and the filtration cavity,
   wherein the second endplate of the outer filter element includes an inner annular flange that includes a barb, and wherein the second endplate of the inner filter element includes legs that engage the barb so as to retain the second endplate of the inner filter element.

18. The filtration assembly of claim 17, wherein the inward protruding flange is a U-shaped lip disposed about an inner surface of the housing, the U-shaped lip defining a groove, where the sealing flange is sealable against at least one of an inner side surface of the U-shaped lip and an inner surface of the groove.

19. The filtration assembly of claim 17, wherein the sealing flange of the filter cartridge and the inward protruding flange of the housing are sealed in a press fit arrangement.

20. The filtration assembly of claim 17, wherein at least one of the sealing flange of the filter cartridge and the inward protruding flange of the housing is a deformable material.

21. The filtration assembly of claim 17, wherein the first endplate of the outer filter element includes at least one rest member disposed at its outer perimeter, the rest member constructed as a stepped protrusion that rest on an end ridge of the housing.

* * * * *